(12) United States Patent
Johnson

(10) Patent No.: US 8,302,764 B2
(45) Date of Patent: Nov. 6, 2012

(54) SPIRAL CONVEYOR SYSTEM AND METHODS

(75) Inventor: Matthew J Johnson, Meridian, ID (US)

(73) Assignee: Laitram, L.L.C., Harahan, LA (US)

( * ) Notice: Subject to any disclaimer, the term of this patent is extended or adjusted under 35 U.S.C. 154(b) by 272 days.

(21) Appl. No.: 12/874,652

(22) Filed: Sep. 2, 2010

(65) Prior Publication Data
US 2011/0056806 A1    Mar. 10, 2011

Related U.S. Application Data

(60) Provisional application No. 61/239,920, filed on Sep. 4, 2009.

(51) Int. Cl.
*B65G 21/08*    (2006.01)
(52) U.S. Cl. ........................ 198/778; 198/850
(58) Field of Classification Search ............... 198/778
See application file for complete search history.

(56) References Cited

U.S. PATENT DOCUMENTS

| | | | |
|---|---|---|---|
| 2,011,786 A * | 8/1935 | Walker ........................ 134/70 |
| 2,591,987 A | 4/1952 | Werden | |
| 2,758,391 A | 8/1956 | Lanham | |
| 2,862,602 A | 12/1958 | Greer et al. | |
| 3,240,316 A | 3/1966 | Huffman et al. | |
| 3,500,989 A | 3/1970 | Cripe et al. | |
| 3,659,697 A | 5/1972 | Brackmann et al. | |
| 3,664,487 A | 5/1972 | Ballenger | |
| 3,682,295 A | 8/1972 | Roinestad | |
| 4,036,352 A | 7/1977 | White | |
| 4,189,047 A | 2/1980 | Beckins | |
| 4,450,953 A | 5/1984 | LeCann et al. | |
| 4,565,282 A | 1/1986 | Olsson et al. | |
| 4,603,776 A | 8/1986 | Olsson | |
| 4,741,430 A | 5/1988 | Roinestad | |
| 4,848,537 A | 7/1989 | Richards et al. | |
| 4,850,475 A | 7/1989 | Lupo et al. | |
| 4,866,354 A | 9/1989 | Miller | |
| 4,899,871 A | 2/1990 | Olsson | |
| 4,901,844 A | 2/1990 | Palmaer et al. | |
| 4,934,517 A | 6/1990 | Lapeyre | |
| 4,941,567 A | 7/1990 | Olsson | |
| 4,944,162 A | 7/1990 | Lang et al. | |

(Continued)

FOREIGN PATENT DOCUMENTS

JP    4217504 A    7/1992

OTHER PUBLICATIONS

IMO Slewing Ring Product Catalog, pp. 1-55, copyright Sep. 2005, IMO Momentenlager GmbH, Gremsdorf, Germany.

*Primary Examiner* — Gene Crawford
*Assistant Examiner* — Keith R Campbell
(74) *Attorney, Agent, or Firm* — James T. Cronvich

(57) ABSTRACT

A double-helix spiral conveyor, a method for conveying articles up and down a spiral conveyor, and a method for constructing a drive drum for a spiral conveyor. The double-helix spiral conveyor conveys articles on the conveyor up the inner side of a spiral drum by engaging the outer edge of the belt and down the outer side of the drum by engaging the inner edge of the belt. A slew drive at the bottom of the drum drives the conveyor.

32 Claims, 22 Drawing Sheets

U.S. PATENT DOCUMENTS

| | | |
|---|---|---|
| 4,951,807 A | 8/1990 | Roinestad et al. |
| 4,953,365 A | 9/1990 | Lang et al. |
| 4,981,208 A | 1/1991 | Jones |
| 4,997,365 A | 3/1991 | Lanham |
| 5,069,330 A | 12/1991 | Palmaer et al. |
| 5,105,934 A | 4/1992 | Cawley |
| 5,183,149 A | 2/1993 | Wierman et al. |
| 5,228,557 A | 7/1993 | Lago |
| 5,310,045 A | 5/1994 | Palmaer et al. |
| 5,343,714 A | 9/1994 | Kiczek et al. |
| 5,343,715 A | 9/1994 | Lang |
| 5,454,467 A | 10/1995 | Lago |
| 5,458,228 A | 10/1995 | Olsson |
| 5,501,319 A | 3/1996 | Larson et al. |
| 5,584,377 A | 12/1996 | Lago |
| 5,743,376 A | 4/1998 | Ochs |
| 6,029,797 A | 2/2000 | Olsson |
| 6,065,463 A | 5/2000 | Martin |
| 6,237,750 B1 | 5/2001 | Damkjaer et al. |
| 6,484,379 B2 | 11/2002 | Palmaer |
| 6,523,677 B1 | 2/2003 | DeGennaro et al. |
| 6,550,610 B2 | 4/2003 | Rettore |
| 6,695,128 B2 | 2/2004 | Palmaer et al. |
| 6,793,068 B2 | 9/2004 | Shefet et al. |
| 6,976,369 B2 | 12/2005 | Nothum, Jr. |
| 7,178,662 B2 | 2/2007 | Olsson et al. |
| 7,258,226 B2 | 8/2007 | Nelson et al. |
| 7,258,227 B2 | 8/2007 | Rettore et al. |
| 7,374,035 B2 | 5/2008 | Olsson et al. |
| 2005/0217977 A1 | 10/2005 | Hartness et al. |
| 2006/0131139 A1* | 6/2006 | Olsson et al. ............... 198/849 |
| 2007/0175738 A1 | 8/2007 | Neely et al. |
| 2011/0174596 A1* | 7/2011 | Johnson ...................... 198/606 |
| 2012/0043182 A1 | 2/2012 | Balk et al. |

* cited by examiner

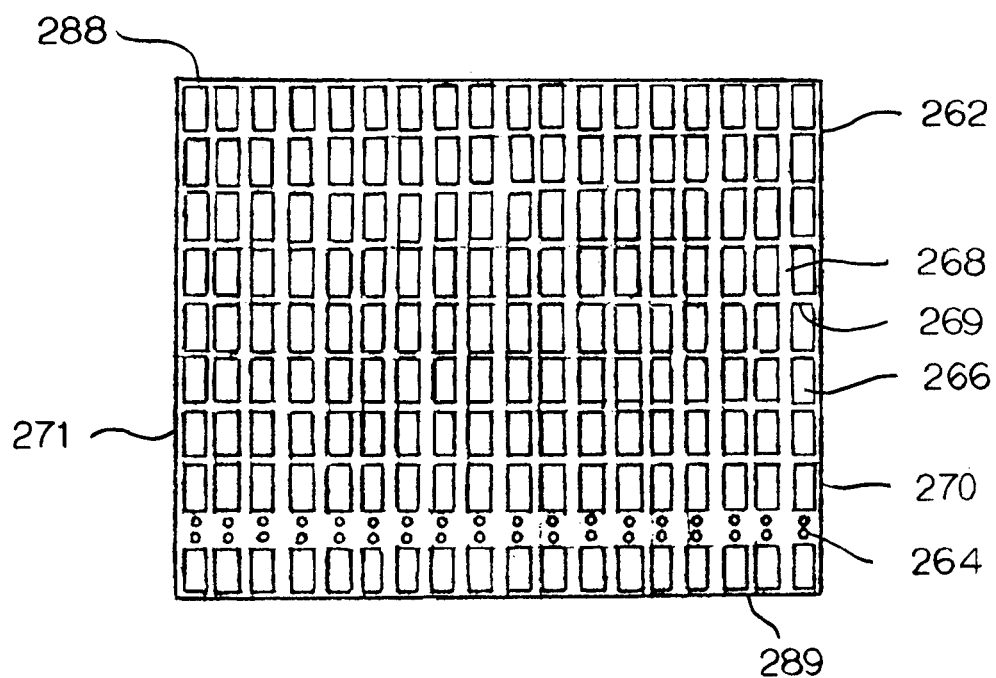
FIG. 29
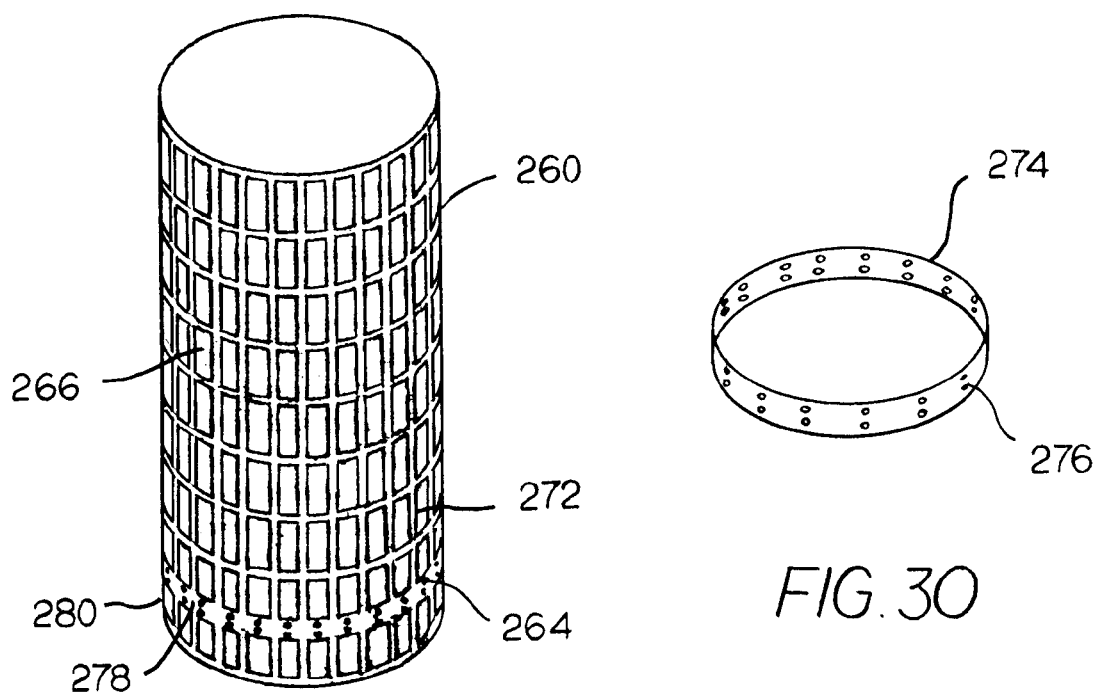
FIG. 30
FIG. 28

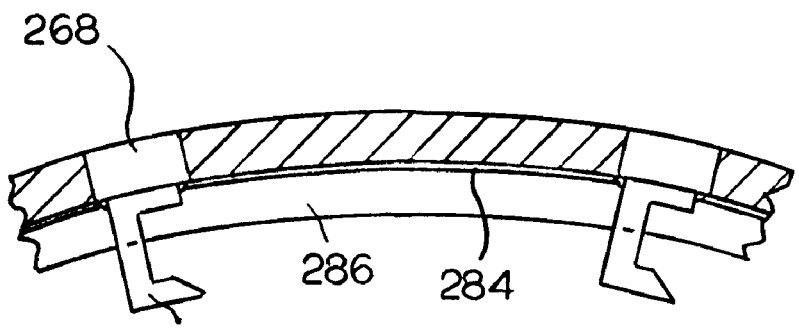
FIG. 31
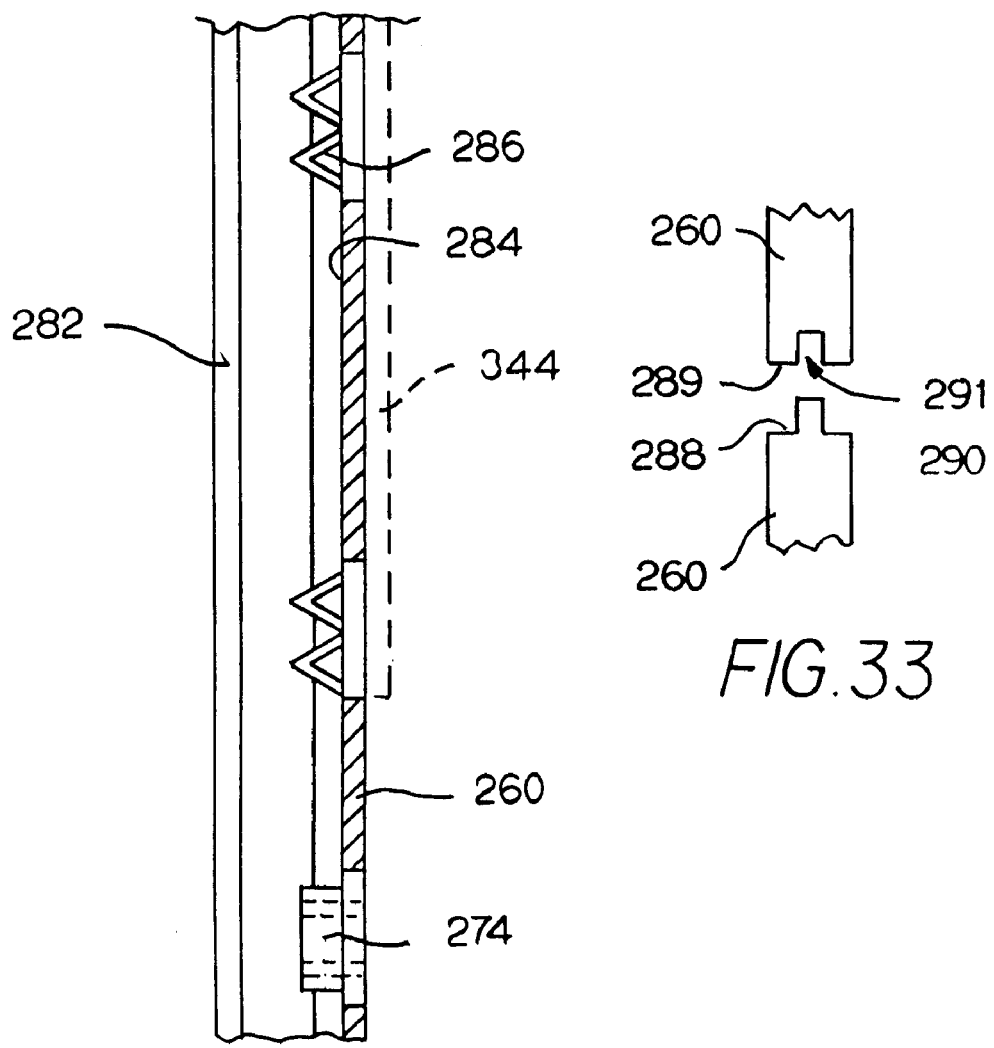
FIG. 32
FIG. 33

SPIRAL CONVEYOR SYSTEM AND METHODS

CROSS-REFERENCE TO RELATED APPLICATIONS

This application claims the priority of U.S. Provisional Patent Application No. 61/239,920, "Spiral Conveyor Systems and Methods," filed Sep. 4, 2009, and incorporated into this application by reference.

BACKGROUND

The invention relates to power-driven conveyors generally and, more particularly, to spiral belt conveyors and methods for transporting articles up and down helical paths.

Conveyor belts are often used to convey articles, such as foodstuffs and other materials, through cooled or heated environments. Spiral conveyors, in which a conveyor belt follows a helical path winding around a central tower, are used in freezers and ovens to provide a long conveying path with a small footprint. Low-tension spiral conveyors, in which the conveyor belt is driven by frictional contact between the outside of a rotating tower, or drum, and the inside edge of the belt, are conventionally used in these applications. Increasing the dwell time of articles in a freezer or oven or feeding and discharging articles at the same level may be achieved by advancing the conveyor belt along two helical paths—one going up and the other going down. But two separate spiral conveyors take up more than twice as much floor space as a single spiral conveyor. If limiting floor space is important, a double-helix spiral conveyor may be used. Some double-helix spiral conveyors use two concentric drive drums having different radii to frictionally drive the conveyor belt helically up the outside periphery of one of the drums and down the other. But these double-helix spirals have a complex cage structure to connect the inside of the drum to the central drive column and provide the structural rigidity needed to maintain the shape of the drum. Furthermore, the two drums and the extensive support structure interfere with airflow through the conveyor and affect the efficiency of the freezer or oven.

SUMMARY

These shortcomings are overcome by a spiral conveyor embodying features of the invention. One version of such a spiral conveyor comprises a rotating drive drum in a conveyor belt that is collapsible in length to negotiate turns. The conveyor belt is driven along an inner helical path inside the rotating drive drum with a vertical component of motion in one direction by the engagement of an outer belt edge with the inner side of the drum and along an outer helical path outside the drum with a vertical component of motion in the opposite direction by the engagement of an inner belt edge with the outer side of the rotating drive drum.

Another aspect of the invention provides a method for conveying up and down a spiral conveyor with a single rotating drum. The method comprises: (a) driving a conveyor belt with a vertical component of motion in a first direction up or down a rotating drum along an inner helical path inside the inner side of the rotating drum by contacting the outer edge of the conveyor belt with the inner side of the rotating drum; and (b) driving the conveyor belt with a vertical component of motion in an opposite second direction down or up the rotating drum along an outer helical path outside the outer side of the rotating drum by contacting the inner edge of the conveyor belt with the outer side of the rotating drum.

BRIEF DESCRIPTION OF THE DRAWINGS

These features and aspects of the invention, as well as its advantages, are better understood by referring to the following description, appended claims, and accompanying drawings, in which:

FIG. 28 is a perspective view of a cageless drive drum usable in a spiral conveyor as in FIG. 1;

FIG. 29 is a plan view of the drum of FIG. 28 before being bent into a cylinder;

FIG. 30 is a perspective view of a reinforcing band for the drum of FIG. 28;

FIG. 31 is a horizontal cross section of a portion of the drum of FIG. 28;

FIG. 32 is a vertical cross section of a portion of the drum of FIG. 28;

FIG. 33 includes enlarged side elevation cross sections of the top and bottom edges of two stackable drums as in FIG. 28 showing tongue-and-groove construction;

DETAILED DESCRIPTION

Figure 1:
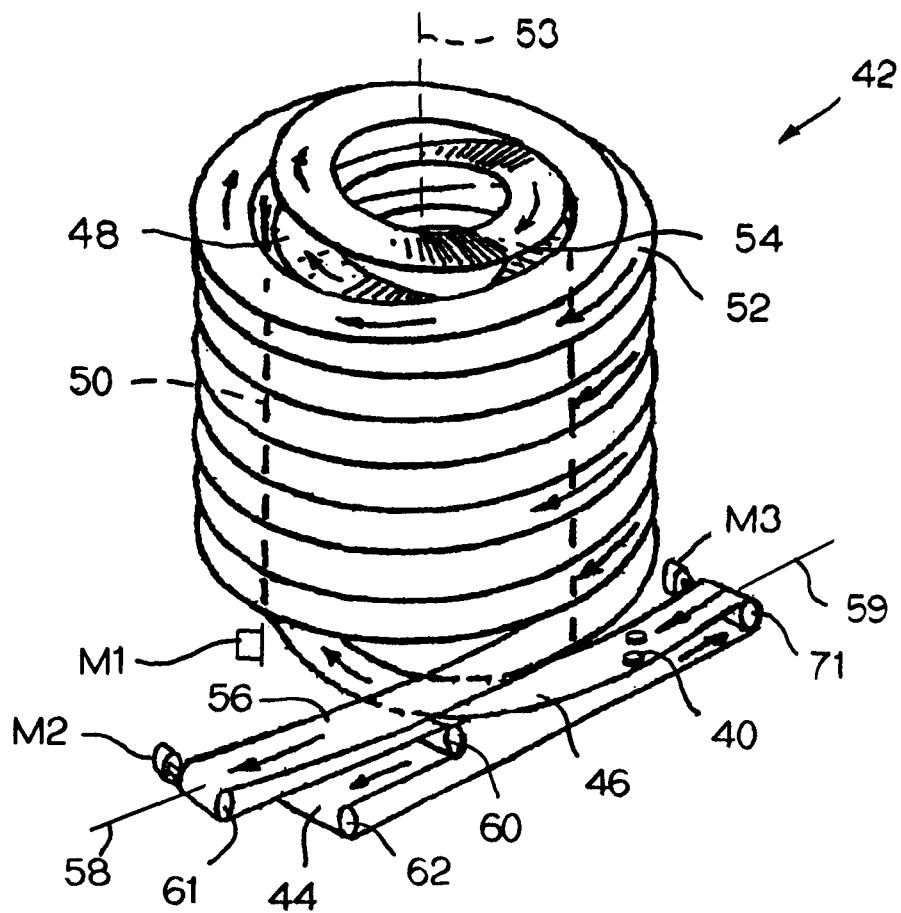
FIG. 1 is a pictorial of a single-drum, double-helix spiral conveyor embodying features of the invention.
Figure 2:
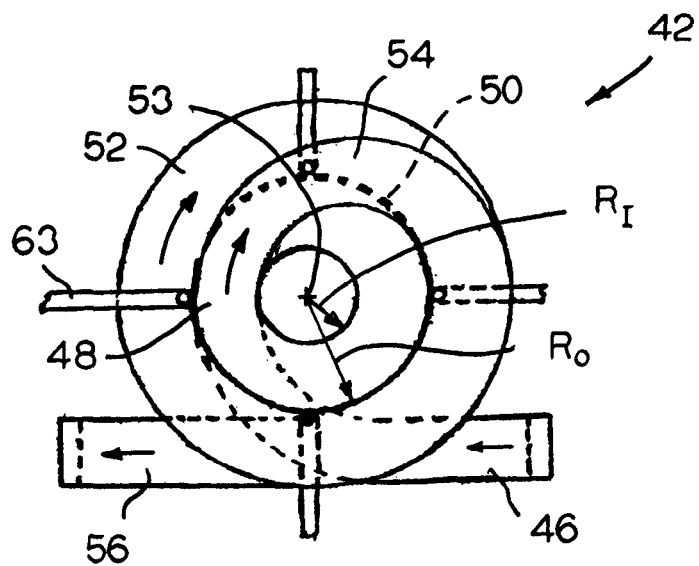
FIG. 2 is a top plan view of the spiral conveyor of FIG. 1.

A conveyor belt following a double-helix path in a spiral conveyor embodying features of the invention is shown in FIGS. 1 and 2. Articles 40 enter the spiral conveyor 42 on the conveyor belt 44 along an infeed path 46, which is generally tangent to an inner helical path 48 just inside a cylindrical drive drum 50. The drum, which is rotated by a drum-drive motor M1, drives the conveyor belt upward along the inner helical path 48 to the top of the spiral conveyor. At the top, the conveyor belt transitions from the inner helical path to an outer helical path 52 that winds helically down the outside of the drum. The conveyor belt winds along the inner and outer helical paths in the same horizontal direction as the rotation of the drum; i.e., clockwise in FIG. 1. But the belt advances with a vertical component of motion in one direction—upward on the inner helical path in FIG. 1—and with an opposite vertical component of motion—downward on the outer helical path. The inner edge of the conveyor belt on the inner helical track is on a radius $R_I$ from the drum's vertical axis of rotation 53. The inner belt edge is on a greater radius $R_O$ on the outer helical track. The conveyor belt follows an overlap, or transition, path 54 at the top of the drum in going from the inner helical path 48 to the outer helical path 52. The belt discharges the article along a discharge path 56 generally tangent to the outer helical path at a discharge level 58 just above the infeed level 59 of the infeed path. The conveyor belt is tensioned against the drive drum by a head pulley or sprocket 61 rotated by a motor M2 at the distal end of the discharge path. A tensioning pulley or sprocket 60 is used to take up slack in the conveyor belt 44 as it returns to the infeed path 46 around an idler pulley or sprocket 62 and a tail pulley or sprocket 71 driven by a motor M3, if necessary, or operated without a motor as an idler sprocket. Upper drum supports 63 bear against the outside of the drum without interfering with the conveyor belt's travel.

Figure 3:
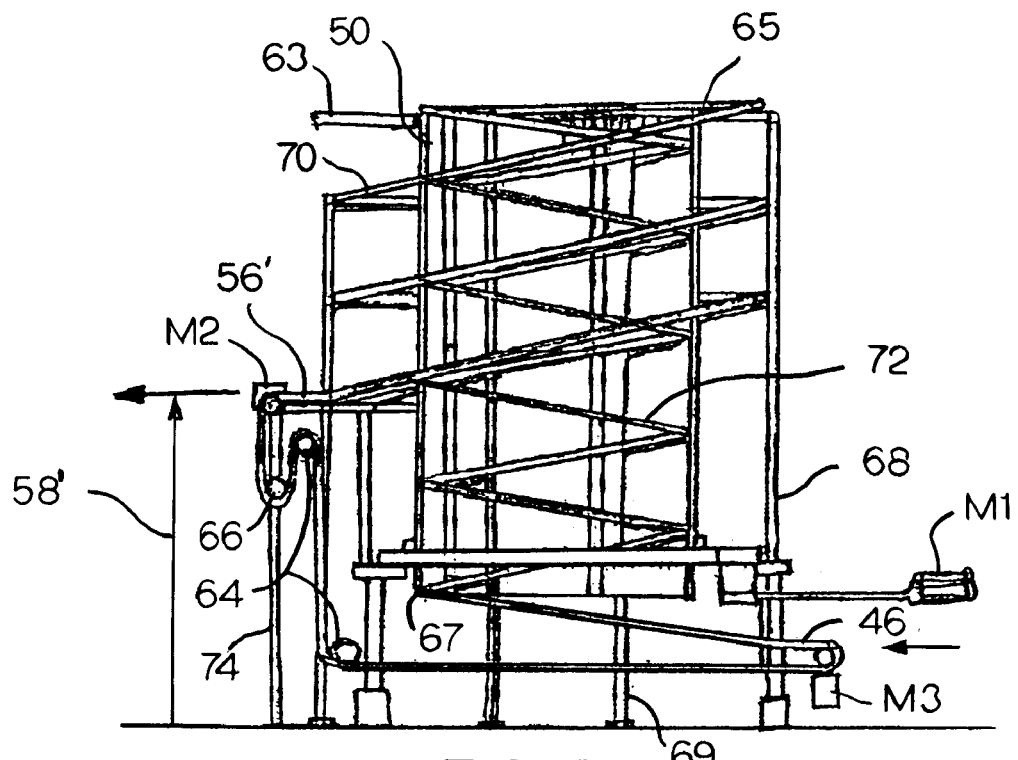
FIG. 3 is a side elevation view with the drum drive cut away of a spiral conveyor as in FIG. 1, but having an elevated discharge.

In the double-helix spiral conveyor shown in FIG. 3, the discharge level 58' of the discharge path 56' is elevated relative to the level of the discharge path 56 in FIG. 1 approximately midway between the top 65 and the bottom 67 of the drum. Return pulleys or sprockets 64 guide the conveyor belt 44 from the discharge path back to the infeed path 46 in the return. A weighted or tensioned pulley or sprocket 66 takes up belt slack in the return. FIG. 3 also shows an outside framework 68 supporting the drum 50, an outer helical track 70 on which the belt rides along the outer helical path, and the drive motors and pulleys. An inside framework 69 extending into the interior of the drive drum supports an inner helical track 72 on which the conveyor belt rides along the inner helical path. The inner and the outer track portions together make up a helical track of two concentric helixes. (If the conveyor belt is a stacker belt, which has built-in spacer frames to support the next higher helical tier of the belt, the spacer frames themselves form the helical track.) The discharge level may be changed by adjusting the height or position of the discharge-conveyor support 74.

Figure 4:
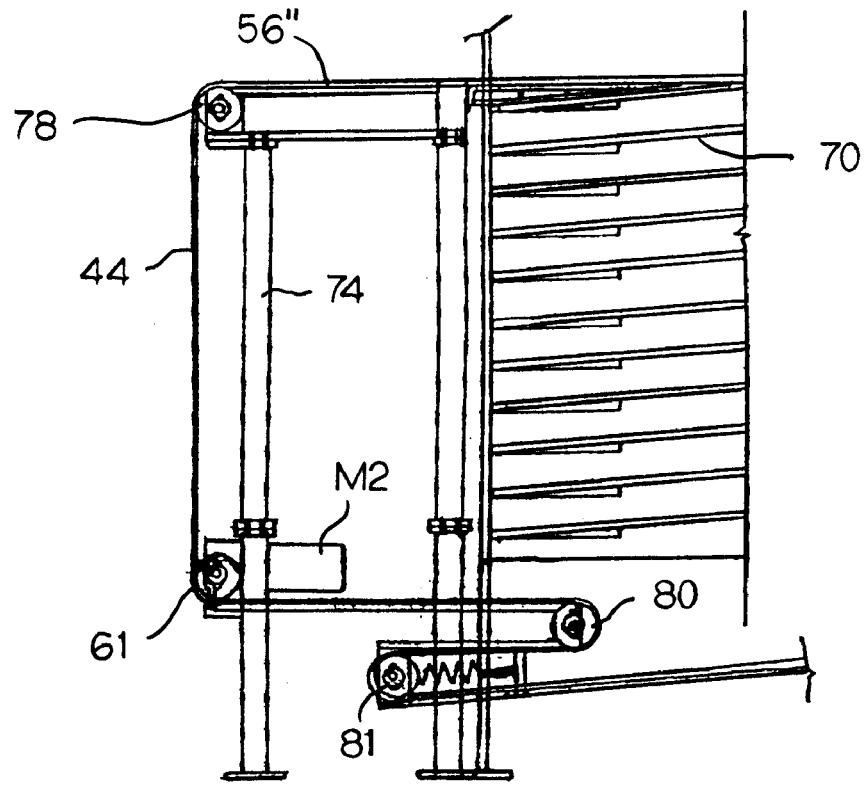
FIG. 4 is a partial side elevation view of a spiral conveyor as in FIG. 1, but with a top discharge.

A high-level discharge path 56" is shown in FIG. 4. In this example, the conveyor belt 44 exits the helical track at the top of the drum, bypassing the outer helical portion 70 of the helical track. The belt is diverted around an upper idler pulley or sprocket 78 to the head-drive pulley or sprocket 61. The belt returnway includes an idler pulley or sprocket 80 working in conjunction with a tensioning pulley or sprocket 81. The discharge-conveyor support 74 may be used to adjust the discharge level between the top and bottom of the drum.

Figure 5:
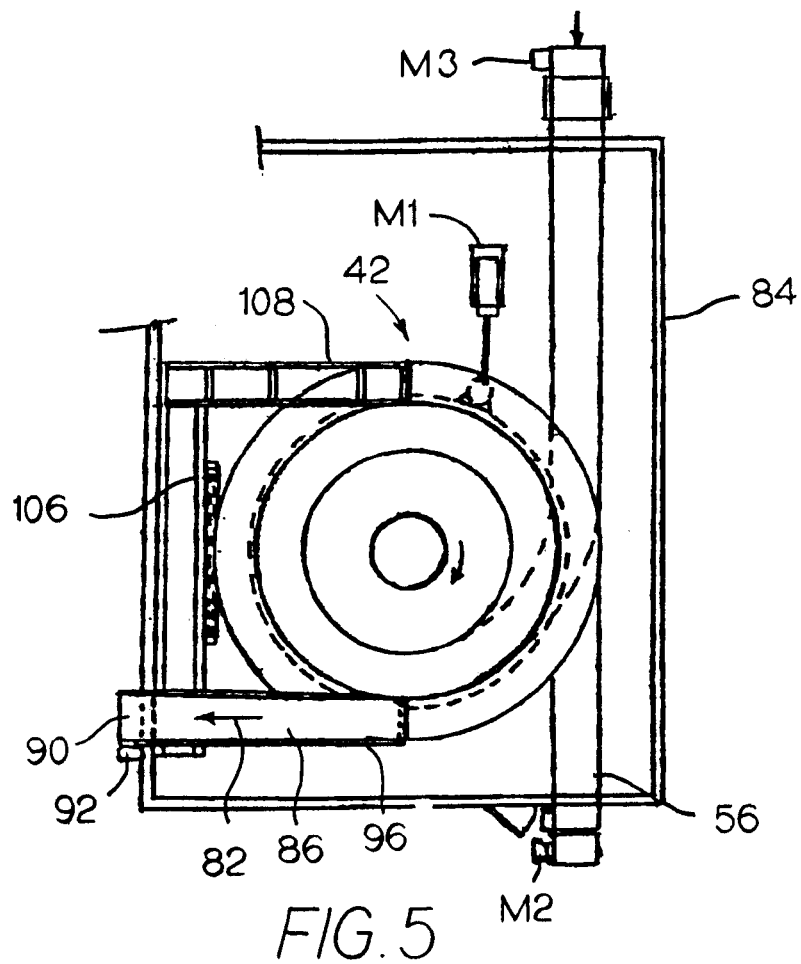
FIG. 5 is a top elevation view of a spiral conveyor as in FIG. 4, but with a selectively actuated top discharge conveyor.
Figure 6:
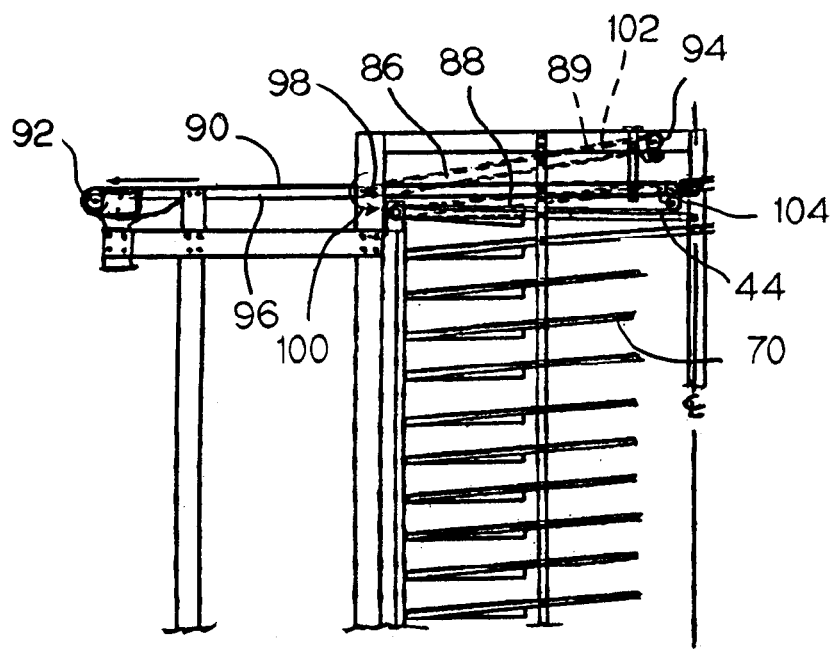
FIG. 6 is a partial side elevation view of the spiral conveyor of FIG. 5.

A selectable high-level discharge path 82 is shown in FIGS. 5 and 6. The spiral conveyor 42 is shown enclosed within the walls of an oven or freezer 84. The infeed path 46 and the fixed discharge path 56 are both at the bottom of the conveyor. A discharge conveyor 86 is selectively movable between a lowered position 88 intercepting articles at the top of the spiral conveyor and a raised position 89 allowing articles to continue along the outer helical path 70 down to the low-level discharge path 56. The discharge conveyor includes a belt 90 trained around a drive pulley or sprocket 92 in an idler roller 94 mounted on a segmented conveyor frame 96 that includes a pivot 98. The pivot rotates about a horizontal axis as indicated by arrow 100 to pivot the inner arm 102 of the segmented frame 96 up and down. A deflection roller 104 deflects the spiral conveyor belt 44 down when the discharge conveyor 86 is lowered to intercept articles from the helical path. A pivot bar 106 joins the discharge conveyor to a deflecting arm 108 with a similar deflecting roller at its distal end. The deflecting rollers bear against the spiral conveyor belt and allow it to continue along its helical path with little extra friction while deflected downward.

Figure 7:
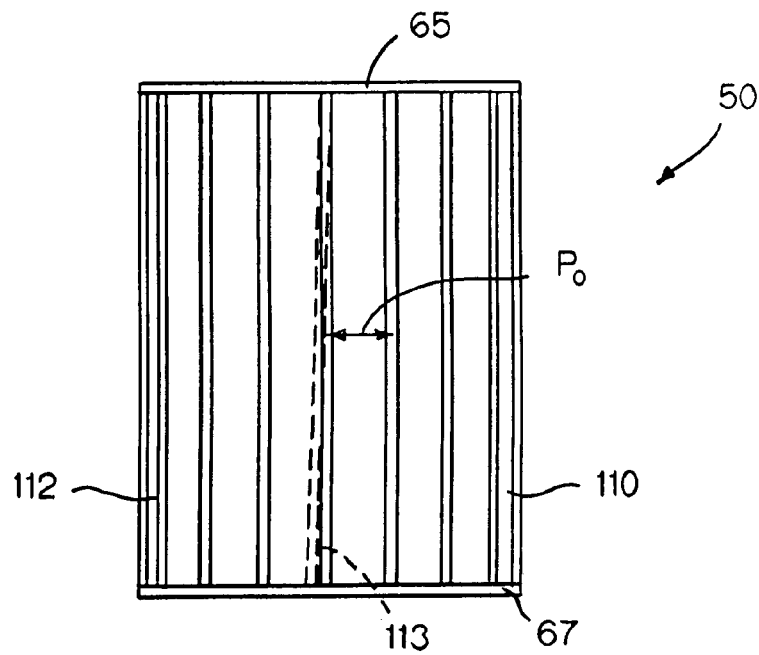
FIG. 7 is a cutaway view of a portion of the inner side of a drive drum for the spiral conveyor of FIG. 1.
Figure 8:
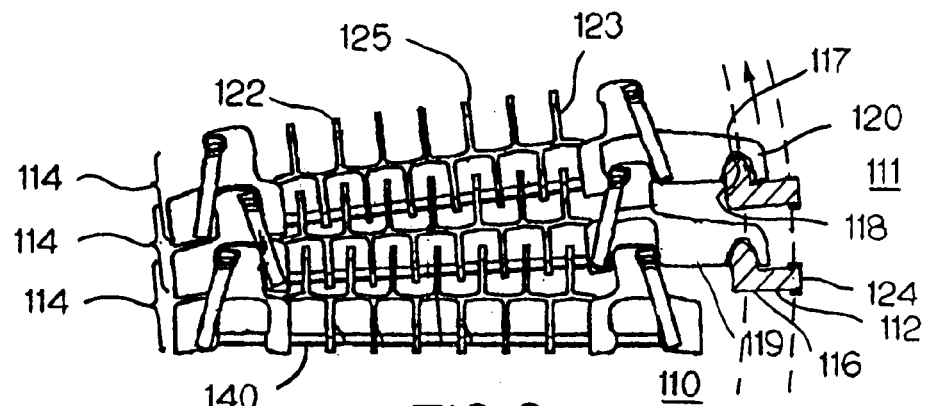
FIG. 8 is a top plan view of a portion of a conveyor belt following an inner helical path on the inside of the drum of FIG. 7.

The inner side 110 of half of the cylindrical drum 50 is depicted in FIG. 7. The drum's inner side has a series of evenly spaced vertical rails 112 extending from the bottom 67 to the top 65 of the drum. The spacing of consecutive rails is the drive pitch $P_D$. (For clarity, FIG. 7 is not drawn to scale.) Instead of being disposed exactly vertically in the drum, the vertical rails could be arranged at a slight angle, e.g., from 0.5° to 3°, off vertical, as represented by dashed rail 113. These angled vertical rails would resemble rifling along the surface of the cylindrical drive drum and may aid in the movement of the conveyor belt up or down the drum in some circumstances. As shown in FIG. 8, the vertical rails include, on the inner side 110 of the drum, an elongated tooth 116 running the length of the vertical rails from the bottom to the top of the drum. The convex distal end 117 of the elongated tooth positively engages complementary drive-receiving surfaces 118 bounding concave recesses in drive-receiving elements 119 in the outer side edge 120 of a modular plastic conveyor belt 122. The modular belt is constructed of a series of rows 114 of belt modules linked by hinge rods 140. The hook formed by the elongated tooth on the vertical rail drives the belt around the inner side of the drum. The conveyor belt slides vertically up the vertical rails as it rides along the inner helical track on which it is supported. Thus, the vertical rails serve as drive elements driving the outer side edge of the belt. The drive-receiving surfaces bounding the recesses form retention structure in the drive-receiving elements that retain the belt on the vertical rails. Hinge-rod holes 123 elongated in the direction of belt travel through hinge elements 125 along one end of each belt row receive the hinge rods 140. In this way, the conveyor belt is collapsible in length. Its inner side edge 121 can collapse on itself at the inside radius of the conveyor belt's path as the belt negotiates a turn. Vertical wear strips 124 mounted to the vertical rails on the outer side 111 of the drum act as frictional bearing surfaces against which the inner belt edges ride over the outer helical path down the spiral conveyor. The elongated tooth and the wear strip are preferably made of a low-friction, wear-resistant material such as UHMW or another plastic.

The terms "positive engagement" and "positive drive," and their variants, are used to mean that drive-receiving structure in the belt is engaged with or driven by a meshing drive structure on the drum that prevents the belt from slipping in the area of engagement. This is opposed to "frictional engagement," "frictional contact," and "frictional driving," and their variants, which mean the belt is driven by frictional contact with a driving surface along which the belt may slip.

Figure 9:
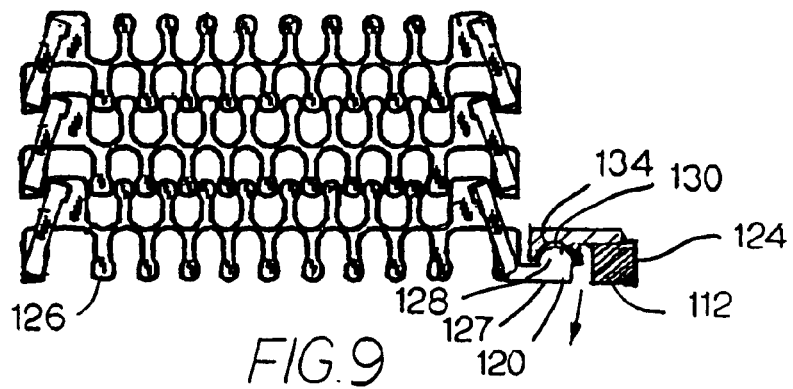
FIG. 9 is a top plan view of a portion of another version of a conveyor belt usable with the drum of FIG. 7, but having a different outer side edge.

Another modular plastic conveyor belt with a different drive-receiving element 127 in its outer side edge 120 is shown in FIG. 9. In this belt 126, the belt's outer edge has a rearward convex protrusion 128 that is received in and pushed by a meshing complementary concave vertical groove 130 in an attachment 132 to the vertical rail 112. A UHMW or other plastic liner 134 lines the groove to reduce friction as the belt slides upward along the grooves as it is positively engaged by the rail structure.

Figure 10:
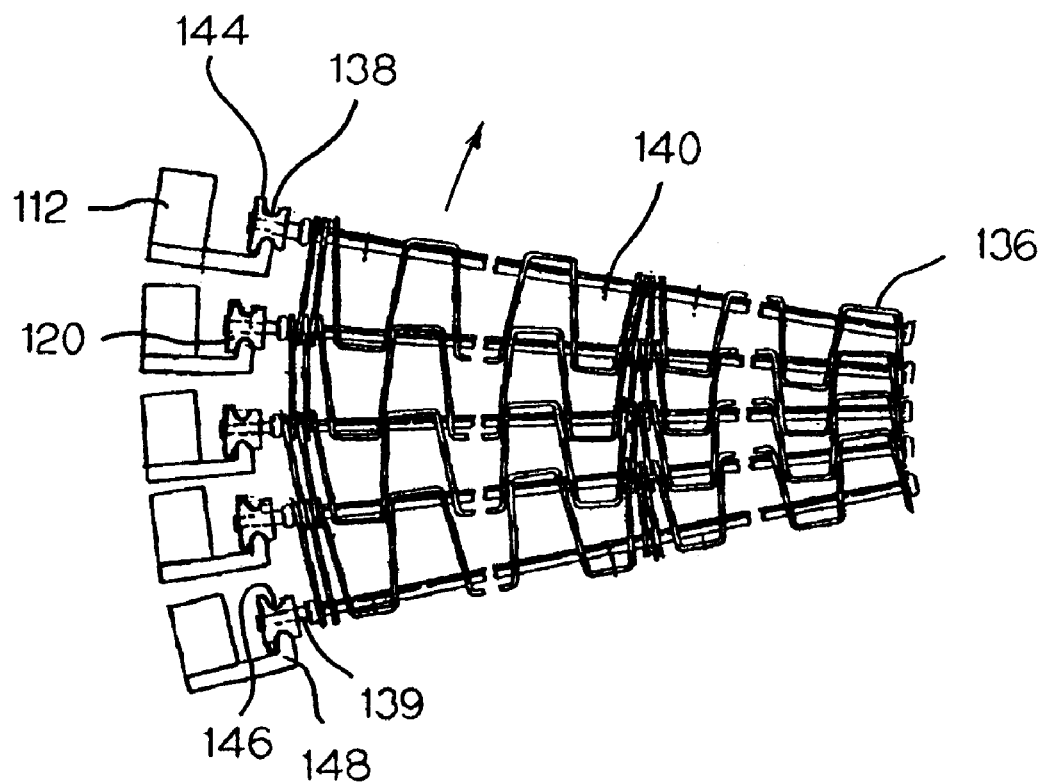
FIG. 10 is a top plan view of a portion of a metal conveyor belt with outside edge rollers usable with a drive drum as in FIG. 7.
Figure 11:
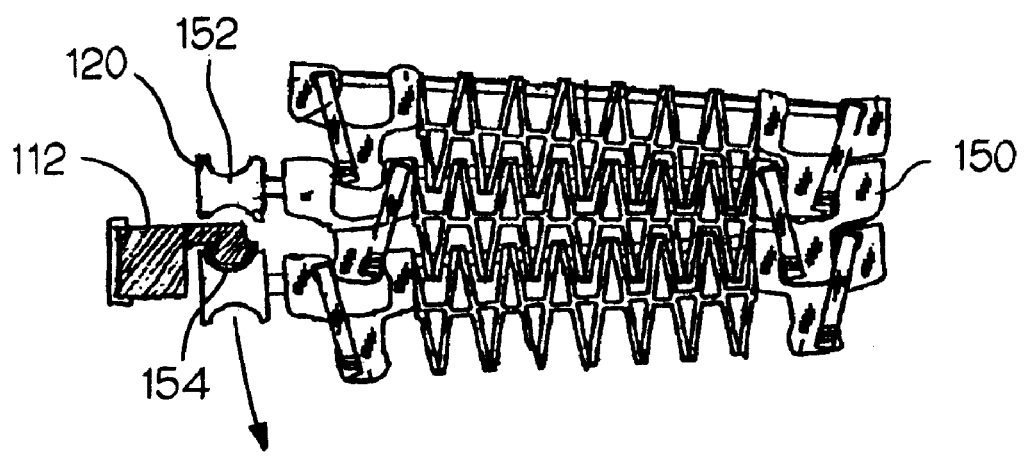
FIG. 11 is a top plan view of another version of a conveyor belt with outer side edge rollers usable with a drive drum as in FIG. 7.

FIG. 10 shows a wire belt 136 whose outer side edge 120 has rollers 138 mounted on extensions 139 of its hinge rods 140 to form drive-receiving elements. The rollers are hourglass shaped with a larger-diameter outer end 142 to retain the belt to the engagement structure 144 of the vertical rail 112. The rollers have narrow waists 146 that ride along convex pushers 148 protruding from the engagement structure 144. FIG. 11 shows another modular conveyor belt 150 with a roller 152 in the outer side edge 120 of the belt engaged by a convex pusher bar 154 forming part of the vertical rail 112 at the inner side of the drum. The rollers at the outer belt edges roll, rather than slide, up the rails as the belts follow their helical path in low-friction rolling engagement.

Figure 12:
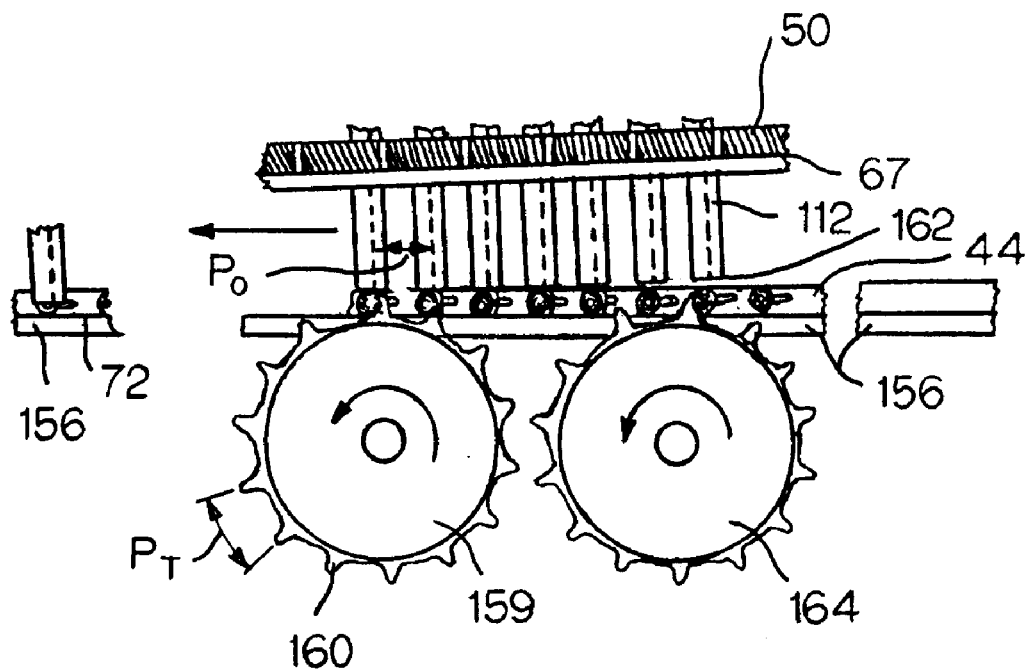
FIG. 12 is a partial side elevation view of the infeed portion at the bottom inner side of the drum in the spiral conveyor of FIG. 1.
Figure 13:
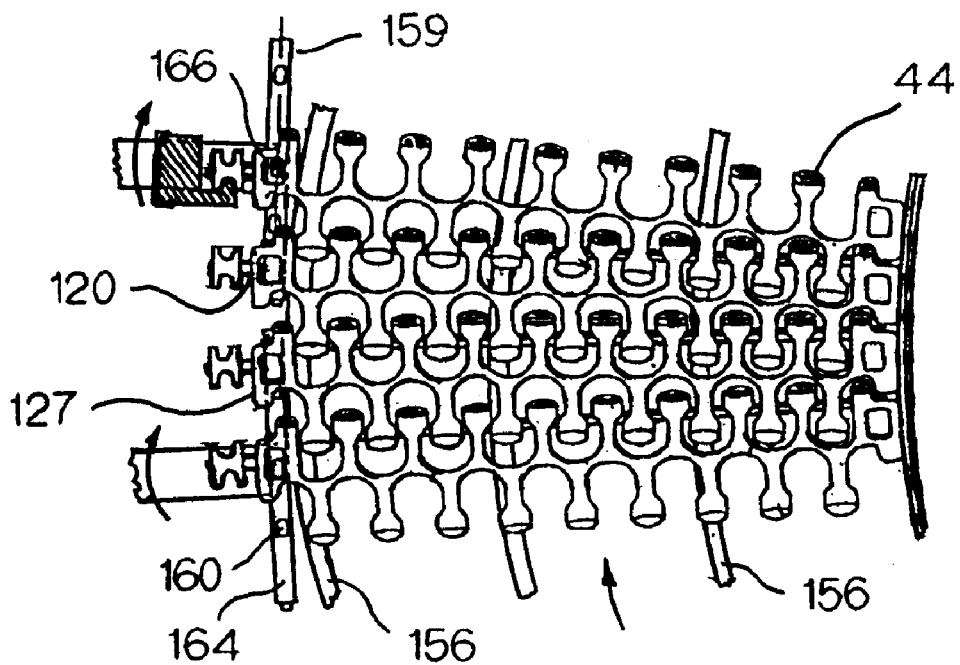
FIG. 13 is a top plan view of the infeed portion of FIG. 12.

FIGS. 12 and 13 show the initial engagement of the conveyor belt 44 with the vertical rails 112 as the belt moves tangentially toward the inner side of the drum from the infeed path to the inner helical path at the bottom 67 of the drum 50. The belt is supported on upwardly canted wearstrips 156 leading from an infeed track 152 to the inner helical track 72. An infeed timing sprocket 159, whose teeth 160 have a pitch $P_T$ equal to or an integral submultiple of the drive pitch $P_D$, is rotated in synchrony with the rotating drum to time the entry of the outside edge 120 into engagement with the bottoms 162 of the vertical rails 112. A second infeed timing sprocket 164, which may be driven or idle, has the same pitch $P_T$ as the timing sprocket 159. The purpose of the second infeed sprocket 164 is to apply pressure against the forward motion of the belt to cause the outside belt edge 120 to open fully so that its expanded pitch at the outside edge matches the pitch $P_T$ of the first timing sprocket 159 and is integrally related to the drive pitch $P_D$. The second infeed sprocket 164 may be biased against the motion of the belt by a spring or other equivalent biasing means. Thus, the second infeed timing sprocket serves as a belt tensioning means that uncollapses the belt's outer side edge on its approach to the infeed timing sprocket 159. The teeth on both sprockets fit into receptacles 166 formed in the outer side belt edge 120 between consecutive drive-receiving elements 127. In this way, the conveyor belt 44 enters cleanly into engagement with the vertical rails 112.

Figure 14:
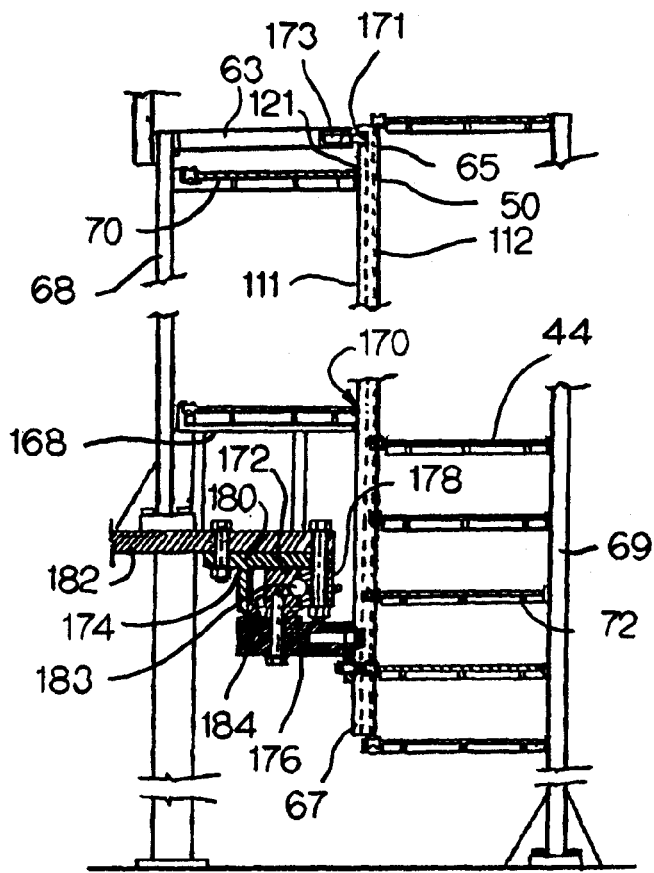
FIG. 14 is a partial side elevation view of a spiral conveyor as in FIG. 1 showing one version of a slew drive.
Figure 34:
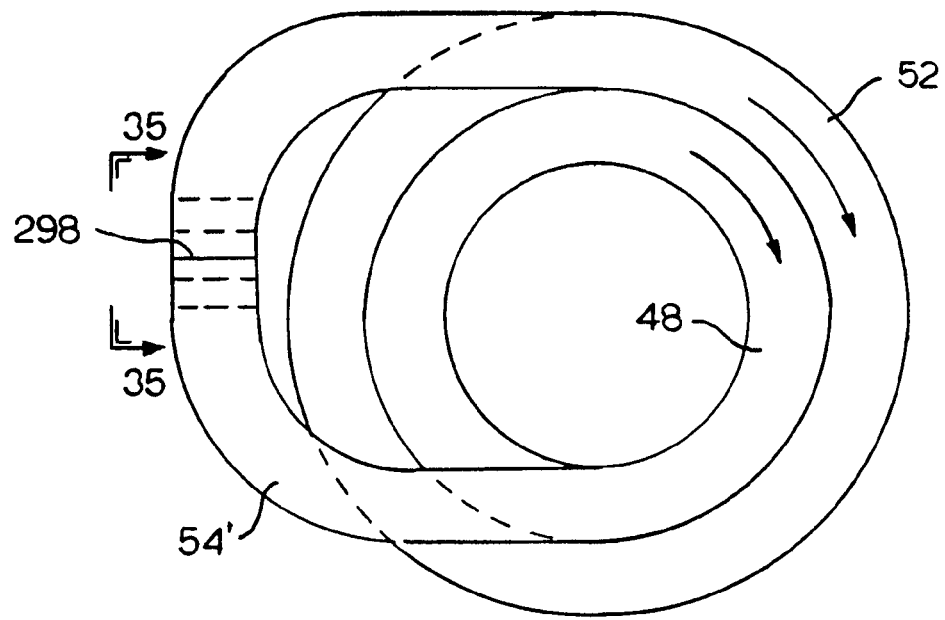
FIG. 34 is a top plan view of another version of the overlap region with a belt-tensioning system for a spiral conveyor as in FIG. 1.
Figure 35:
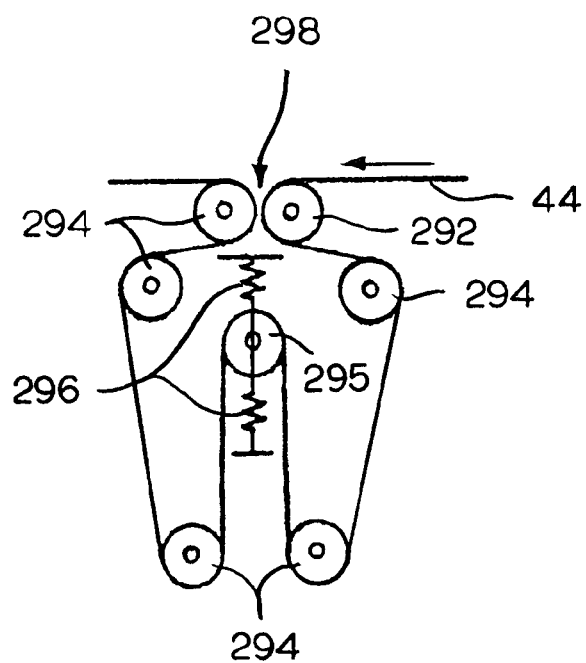
FIG. 35 is a side elevation view of the overlap region taken along lines 35-35 of FIG. 34.

Half of the spiral conveyor is shown in cross section in FIG. 14. The conveyor belt 44 is shown supported on the inner helical track 72, the outer helical track 70, and a return track 168 below the discharge level. The outer and return tracks and the inner track are supported by the outside and inside framework 68, 69. On the inside track, the outer edge 120 of the conveyor belt is positively driven by engagement with the vertical rails 112 on the rotating drum 50. On the outer track, the inner edge 121 of the conveyor belt is driven by frictional contact with the outer side 111 of the rotating drum. Because the belt is positively driven on the inside of the drum and allowed to slip on the outside, the horizontal component of velocity of the belt's outside edge on the inner helical track is equal to the tangential velocity of the inner side of the drum, while the horizontal component of velocity of the belt's inside edge on the outer helical track is typically less than the tangential velocity of the outer side of the drum. Nevertheless, it is necessary to partially collapse the outside edge of the modular conveyor belt on the shorter inner helical path to feed enough belt to the longer outer helical path. Thus, the effective pitch of the positively driven belt on the inner helical path will be less than the belt's fully expanded pitch $P_B$ on the outer helical path. Consequently, the drive pitch $P_D$ on the inner side of the drum is less than a selected integral multiple, e.g., $P_B$, $2P_B$, $3P_B$, $4P_B$, or $5P_B$, of the fully expanded pitch of the belt. By bunching the modular conveyor belt in this way on the inner helical path, the effective speed of the belt in module rows per second can be made to match that on the longer outer helical path. The belt on the return track 168 is separated from contact with the outside of the drum by a gap 170. The top 65 of the drum has an outer notch 171 in which support rollers 173 in the upper drum supports 63 ride to support the top of the rotating drum with little friction. As shown in FIGS. 34 and 35, tensioning and take-up can optionally be provided in the overlap path at the top of the drive drum. On the overlap path 54', the conveyor belt 44 wraps around a drive sprocket or pulley 292 driven by a motor (not shown) that is synchronized with the drum drive motor. The belt is diverted below and returned to the overlap path by the drive sprocket and a series idle sprockets or pulleys 294, 295. The central idle pulley 295 is tensioned to the conveyor frame by springs 296 or the like. Conveyed articles can easily transfer across the narrow gap 298 formed by the diversion of the conveyor belt. The diversion allows for the build-up of excess conveyor belt caused by differences in belt speed on the positive-drive inner helical path 48 and on the friction-driven outer helical path 52.

Figure 36:
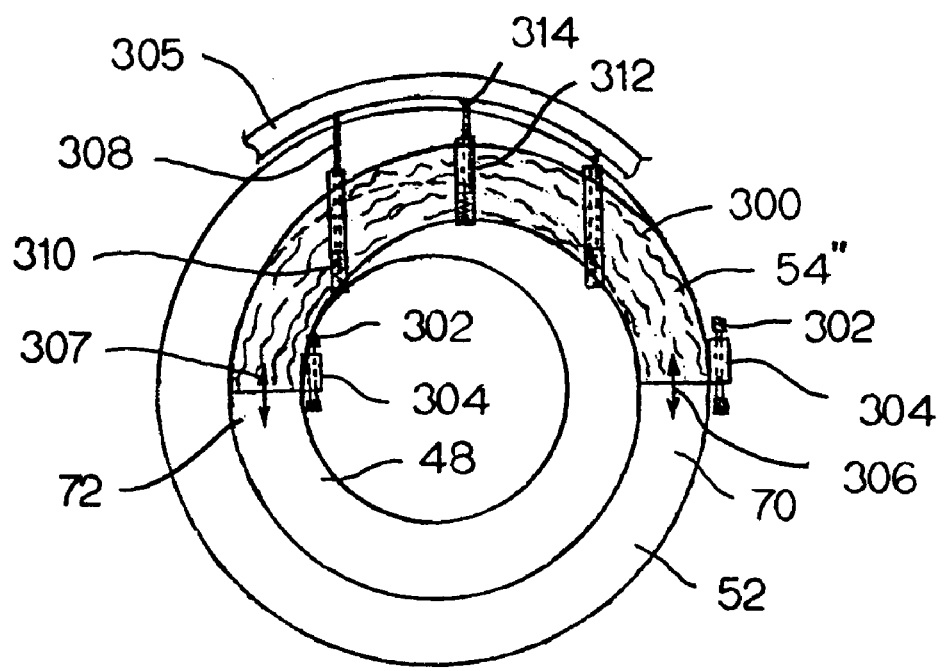
FIG. 36 is a top plan view of yet another version of the overlap region with a slider-tray tensioning system for a spiral conveyor as in FIG. 1.
Figure 37:
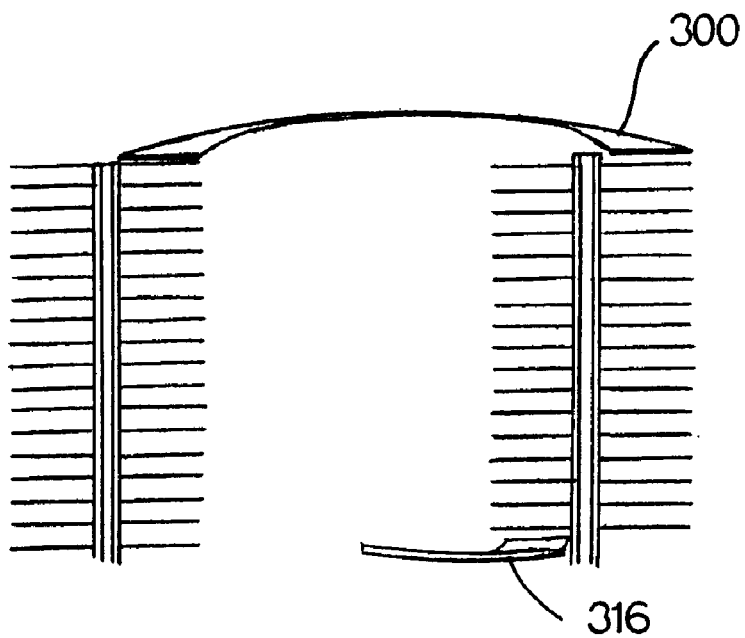
FIG. 37 is a cutaway side elevation view of a spiral conveyor as in FIG. 1 showing infeed and overlap slider trays.

Another method of tensioning the conveyor belt in the transition path 54' is shown in FIG. 36. In this example, the transition path is defined by a generally semicircular upper slider tray 300 connecting the inner helical path 48 to the outer helical path 52. The upper slider tray 300 is also shown in FIG. 37. Frame attachment members 302 fasten the ends of the upper slider tray 300 to the spiral frame 304 and maintain the centerlines 306, 307 of the ends of the upper slider tray 300 in the outer and inner helical tracks 70, 72 in alignment. A slider-tray tensioning system consists of, for example, three rods 308 compressing springs 310 housed in bushings 312 from which the rods extend. The distal ends of the rods threadedly engage adjustment nuts 314 on the outer conveyor frame 305. The bushings are attached to the upper slider tray at three positions. The extension of the rods from the frame can be adjusted with the adjustment nuts to distort the shape of the slider tray, which affects the tension in the belt confined within the tray without changing the alignment of the centerlines of the slider tray and the inner and outer helical tracks. Besides positioning the belt in the transition, tension is used to expand to the full pitch of the belt so that gaps between belt rows are provided to receive the vertical rails. An untensioned infeed slider tray 316 at the bottom of the drum extends over a smaller arc between 90° and 180° to suit the conveyor type, width, and positioning requirements. The infeed slider tray is static and is used to properly position the conveyor belt for its transition from the infeed tail pulley into initial engagement with the rails at the bottom of the drive drum.

Figures 38, 39:
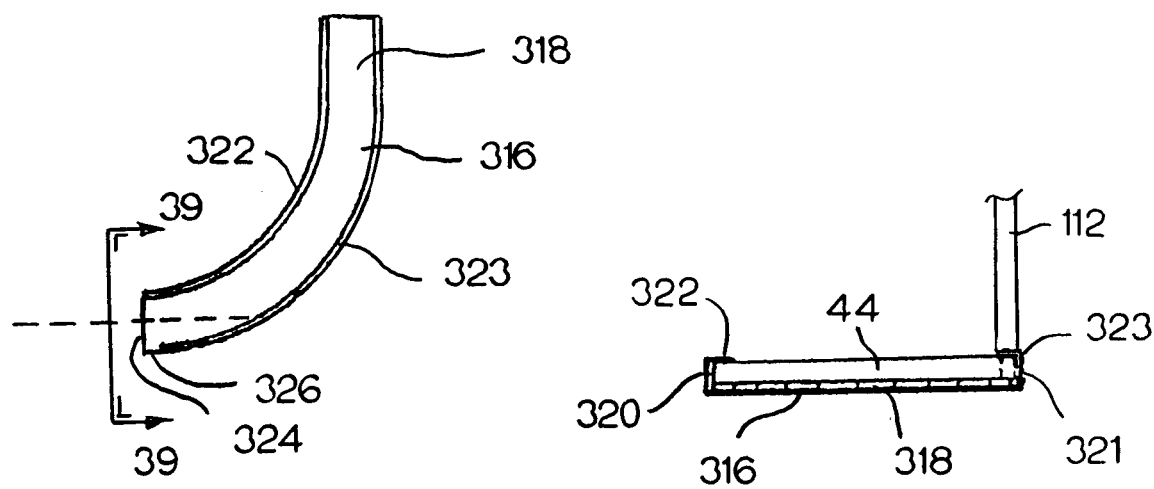
FIG. 38 is a top plan view of an infeed slider tray as in FIG. 37.
FIG. 39 is a side elevation view of the infeed slider tray taken along lines 39-39 of FIG. 8.
Figures 40, 41:
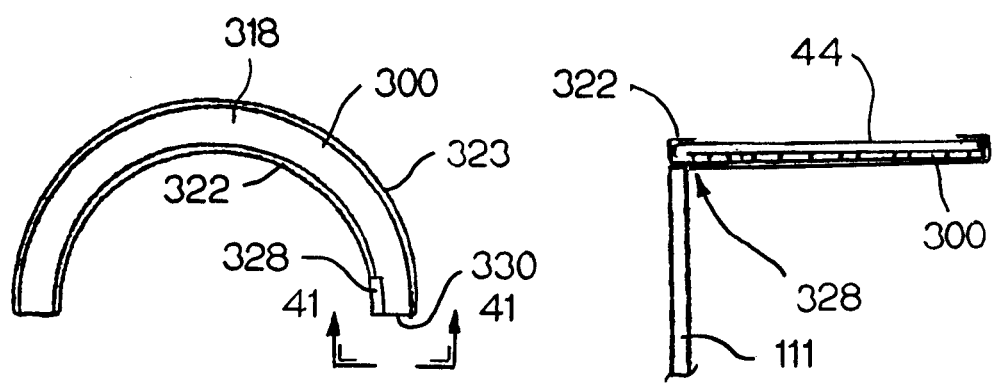
FIG. 40 is a top plan view of an overlap slider tray as in FIG. 37.
FIG. 41 is a side elevation view of the overlap slider tray taken along lines 41-41 of FIG. 40.

Further details of the infeed slider tray 316 are shown in FIGS. 38 and 39. The tray has a bottom 318 with upwardly extending side walls 320, 321 that terminate in lips 322, 323 overhanging the bottom a short distance to retain the conveyor belt 44 in the tray. The lip 323 along the outside side wall 321 terminates just short of the exit end 324 of the infeed slider tray to leave an exposed belt edge 326 that facilitates engagement with the inner drive members on the vertical rails 112 at the bottom of the drum.

Figure 19:
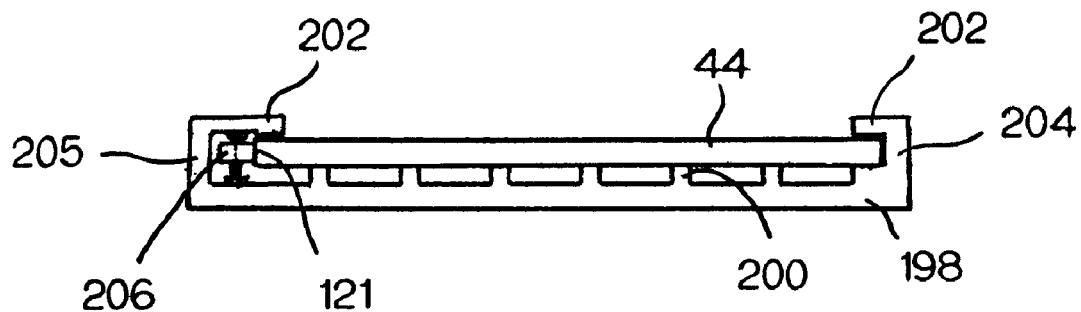
FIG. 19 is a cross section of the conveyor-belt track in the overlap region of FIG. 18.

The upper slider tray 300 is similar to the infeed slider tray, except that it extends over a longer arc, for example, 180°; its lips 322, 323 extend along the entire arc of the tray; and the bottom 318 has an opening 328 at the inside edge of the tray just short of its exit end 330 at the top of the drum. The opening helps ease the inside edge 332 of the belt 44 into engagement with the outer side 111 of the drum. The bottoms of the trays may present a flat surface or an undulating, dimpled, or castellated surface, for example, as shown in FIG. 19, to the bottom of the conveyor belt. The trays may further include rollers as in FIG. 19 for low-friction rolling contact with the conveyor belt.

Figure 42:
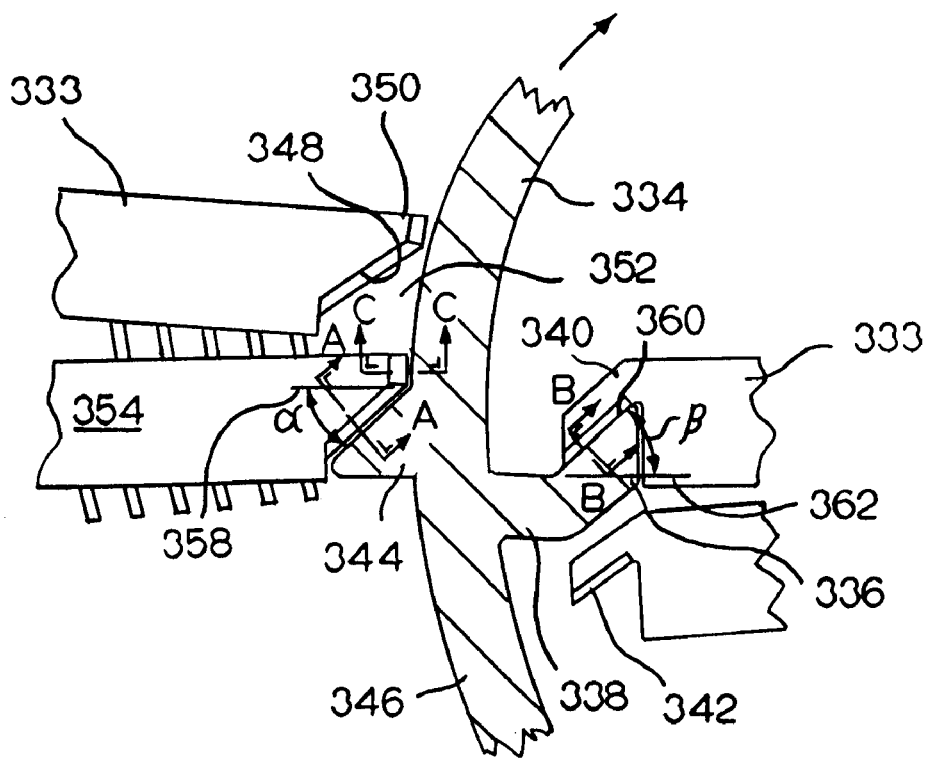
FIG. 42 is a horizontal cross section of a portion of a spiral conveyor as in FIG. 1 positively driving a conveyor belt both up and down the drive drum.

Another variation of a single-drum, double-helix spiral conveyor as in FIG. 1 is shown in FIG. 42. In this version, a conveyor belt 333 is positively driven, rather than frictionally driven, along the outer helical path of a drive drum 334 rotating clockwise in FIG. 42. Hook-shaped drive members 336, formed with inner vertical drive rails 338 regularly spaced around the inner side 110 of the drum, drive the outer side edge of the belt. Rounded or tapered drive-receiving surfaces 342 in the outer side edge of the belt lessen frictional contact with the drive members as the belt rides up the drum as shown in more details in FIGS. 49A and 49B. On the outer helical path, the belt is positively driven downward without slip by drive bars 344 protruding from the outer side 346 of the drum and forming outer vertical drive rails, as also shown in FIG. 32. The drive bars include drive members that engage rounded or tapered drive-receiving surfaces 348 in the inner side edge 350 of the belt as shown in more detail in FIGS. 48A, 48B, and 50. The vertical drive bars 344 are spaced apart around the periphery of the drum and fit into spaces 352 formed between consecutive belt modules 354. The drive bars are spaced to drive every belt row or every second, third, or fourth belt row, for example. The drive surface 356 of the drive bar forms an outer drive angle α with a normal line 358 to the drum's outer periphery. The outer drive angle α is preferably between about 30° and about 45° to maintain dynamic equilibrium. On the inner side of the drum, the drive surface 360 of the drive member forms an inner drive angle β with a radial line 362 of the drum. To maintain the dynamic equilibrium of the spiral conveyor, the inner drive angle β is preferably between about 45° and about 60°. The drive-receiving surfaces 342, 348 on the outer and inner side edges of the belt are correspondingly angled for parallel, mating engagement with the drive surfaces.

Figure 48A:
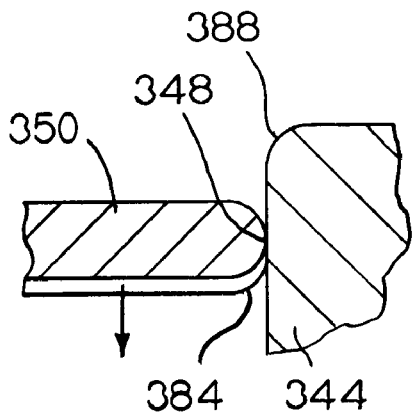
FIGS. 48A and 48B are enlarged cross sections of the spiral conveyor taken along lines A-A of FIG. 42 at the top and at the bottom of the spiral conveyor.
Figure 48B:
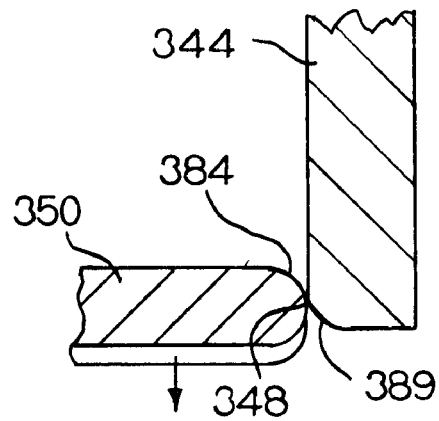
Figure 49A:
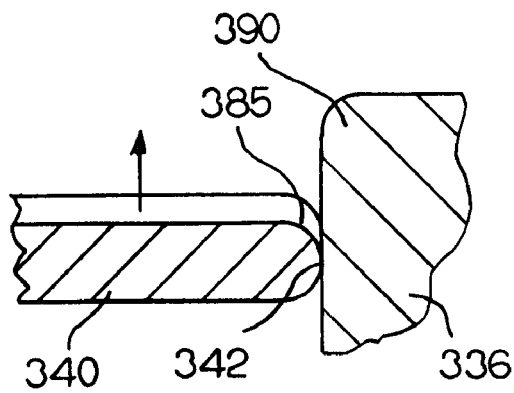
FIGS. 49A and 49B are enlarged cross sections of the spiral conveyor taken along lines B-B of FIG. 42 at the top and at the bottom of the spiral conveyor.
Figure 49B:
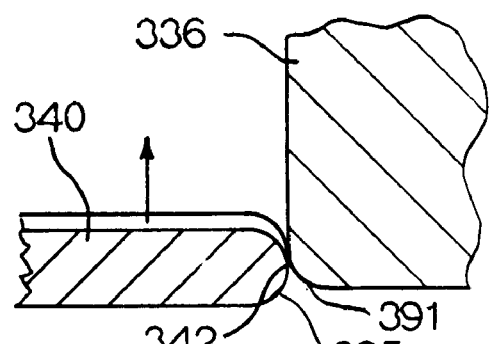
Figure 50:
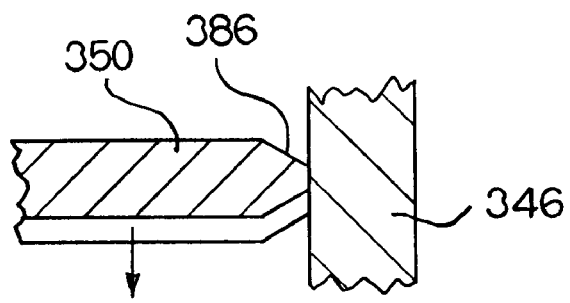
FIG. 50 is an enlarged cross section of the spiral conveyor taken along lines C-C of FIG. 42 in the middle of the spiral conveyor.

Because the conveyor belt is positively driven on both the inner and outer helical paths in this version, frictional engagement between both belt edges and the drive drum or the vertical rails is unnecessary and unwanted. To reduce the friction, the drive-receiving surfaces 342, 348 on the outer and inner side edges of the belt are rounded or tapered to reduce their contact area with the drive members 336, the drive bars 344, and the outer side 346 of the drum. FIGS. 48A, 48B, 49A, and 49B show rounded corners 384, 385 along the belt edge. FIG. 50 shows a tapered belt edge 386. In both cases, the vertical dimension of the area of contact on the belt is less than the general thickness of the belt. If the belt is positively driven only on the inner helical path, the inside edge of the belt, which is designed to be frictionally driven, would not include the rounded or tapered surfaces. As shown in FIGS. 48A and 48B, the upper edge 388 and the lower edge 389 of the outer drive bar 344 are rounded to aid in the entry and exit of the belt from engagement with the drive drum. Similarly, as shown in FIGS. 49A and 49B, the upper and lower edges 390, 391 of the inner drive members 336 are rounded for the same purpose.

Figure 43:
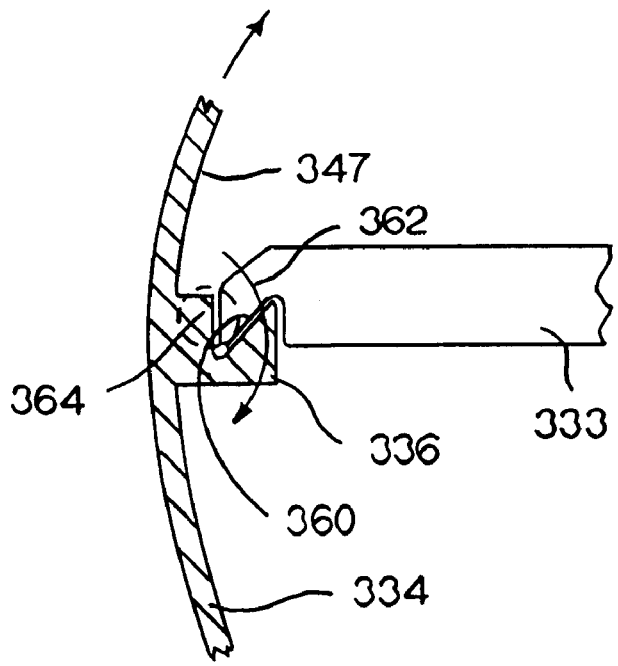
FIG. 43 is a horizontal cross section of a portion of a spiral conveyor as in FIG. 1 showing another version of a drive rail on the inside of the drive drum.

The conveyor belt 333 tends to pivot out of engagement with the drive members 336 on the inner helical path, as indicated by arrow 362 in FIG. 43. A restriction 364 between the inner side 347 of the drum 334 and the drive surface 360 opposes any pivoting of the belt and maintains the positive engagement between the belt and the drum.

Figure 44:
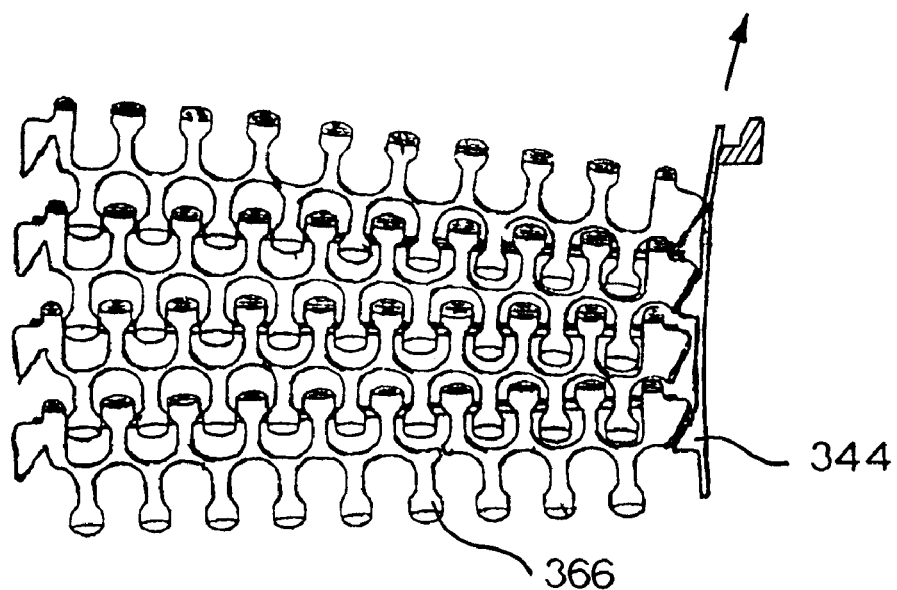
FIG. 44 is a plan view of a portion of one tier of a spiral conveyor as in FIG. 1 showing a modular plastic conveyor belt positively driven on the outside of the drive drum.
Figure 45:
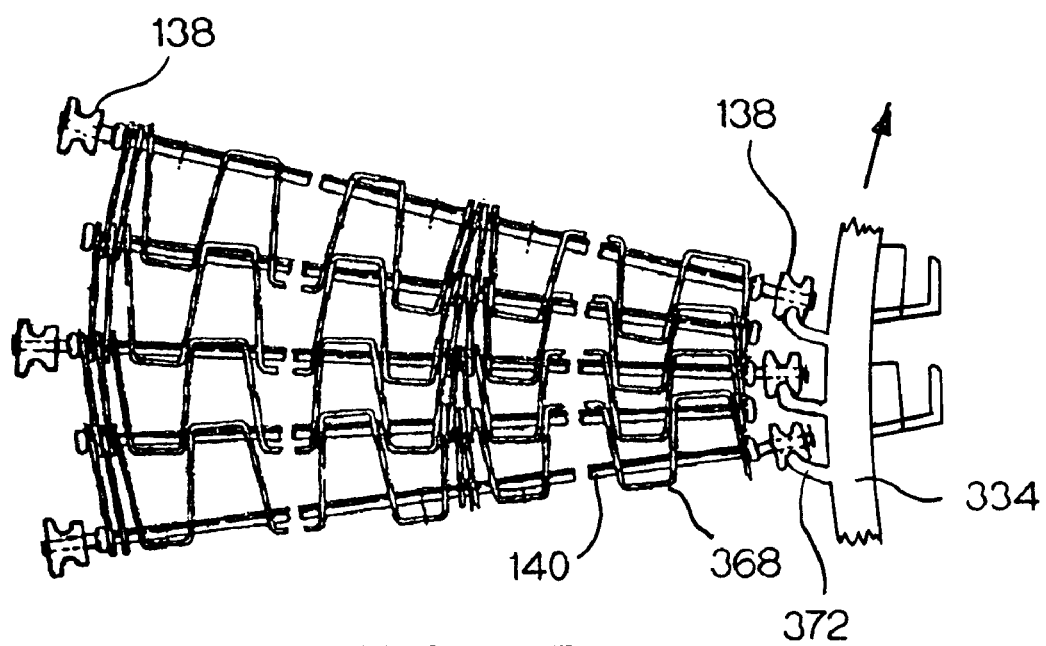
FIG. 45 is a plan view of a portion of one tier of a spiral conveyor as in FIG. 1 showing a metal belt positively driven on the outside of the drive drum.
Figure 46:
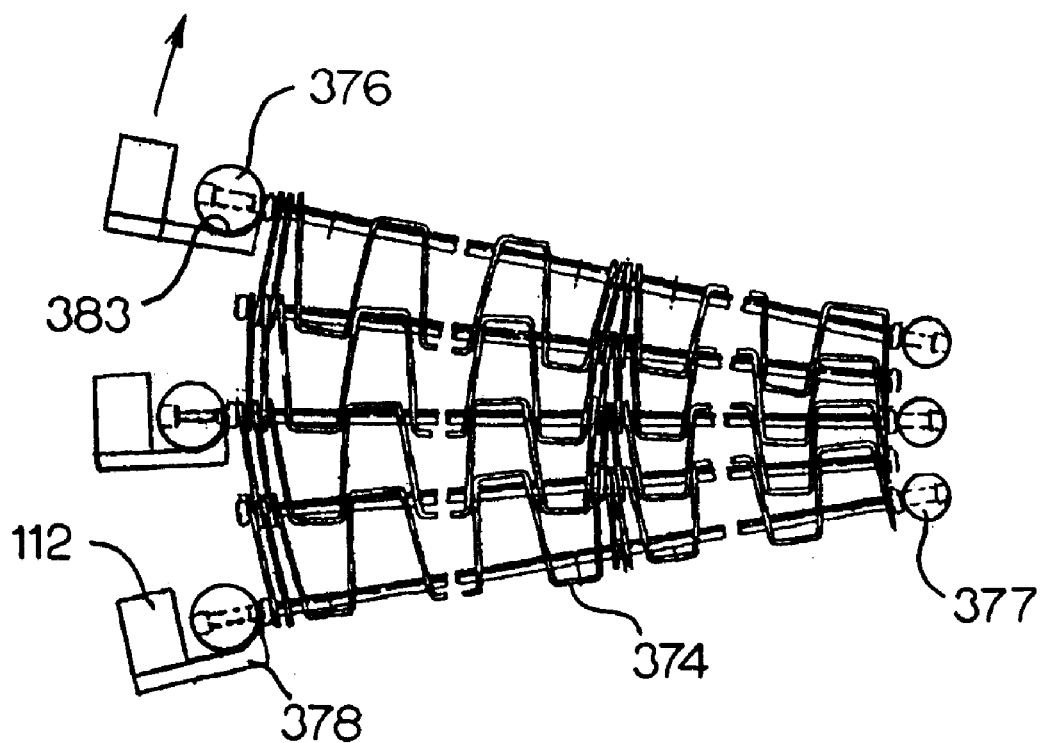
FIG. 46 is a plan view of a portion of one tier of a spiral conveyor as in FIG. 1 showing a metal belt with roller balls in the edges positively driven on the inside of the drive drum.
Figure 47:
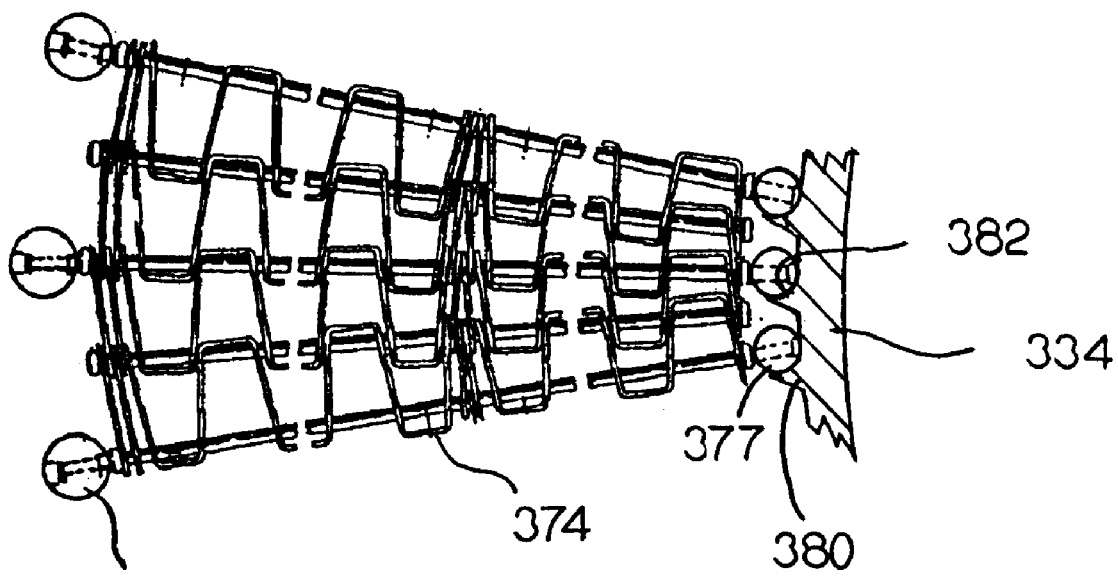
FIG. 47 is a plan view of a portion of one tier of a spiral conveyor as in FIG. 1 showing the metal belt of FIG. 46 positively driven on the outside of the drive drum.

FIGS. 44-47 illustrate various styles of conveyor belts positively driven along the inner and outer helical paths. FIG. 44 shows a modular plastic conveyor belt 366 being positively driven along the outer helical path by the vertical drive bars 344, which engage the inside edge of every other collapsed belt row. FIG. 45 shows a metal belt 368 similar to the belt in FIG. 10, but with rollers 138 extending from the inside edge of the belt. The rollers define drive-receiving surfaces that are engaged by hook-like drive members 372 formed on the outer side of the drum 334. FIGS. 46 and 47 show a metal belt 374, similar to the belt in FIG. 45, but with roller balls 376, 377 at each outer side edge. The outer roller balls 376 at the outside edge of the belt are engaged by hook-like drive members 378 on vertical rails 112 to positively drive the belt along the inner helical path. The inner roller balls 377 at the inside edge of the belt are engaged by vertical drive bars 380 in the outer periphery of the drum 344 to positively drive the belt along the outer helical path. The vertical drive bars 380 and the hook-like drive members 378 define concave drive surfaces 382, 383, in which the roller balls nestle as they advance upward or downward along the vertical drive bar or drive member in low-friction rolling contact. Conveyor belts with these edge features could be self-stacking belts with stacker plates, instead of static conveyor structure, forming the inner and outer helical tracks.

The drum 50 is connected to the outer gear ring 172 of a slew drive 174 by an annular mounting bracket 176 bolted to the periphery of the spiral drive drum 50 at its bottom 67. The inner ring 178 and the housing 180 of the slew drive are bolted to an annular mounting plate 182 supported by the outside framework 68. The inner and outer rings are separated by a ring of rolling bearings 183, which all together form a slewing ring. The slew-drive motor M1 drives a gear that meshes with outer gear teeth 184 in the outer ring 172 to rotate the drum 50.

Figure 15:
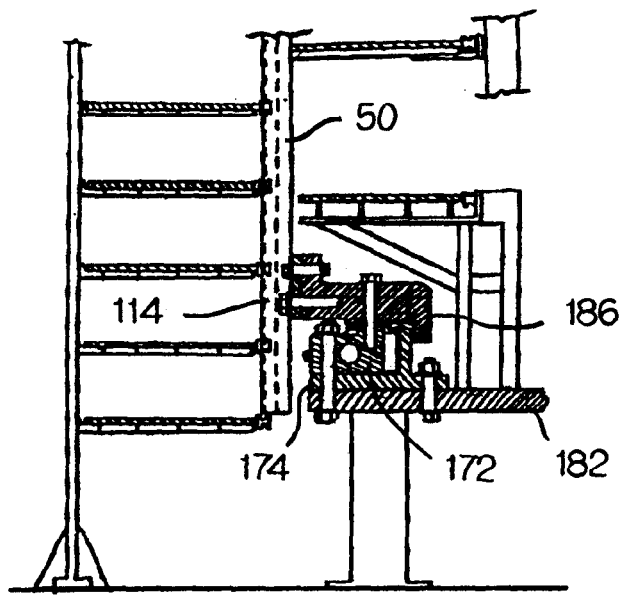
FIG. 15 is a partial side elevation view of a spiral conveyor as in FIG. 1 showing another version of a slew drive.

Unlike the slew-drive arrangement of FIG. 14, in which the slew drive is suspended from the bottom of the mounting plate 182, the slew drive 174 in FIG. 15 sits atop the mounting plate 182. A drive-drum collar 186 bolted to the bottom 67 of the drum 50 and the outer slewing ring 172 connects the drum to the slew drive. The slewing ring and the slew drive could alternatively be mounted at the top of the drum. Slewing rings and slew drives of this kind are manufactured and sold by IMO Antriebseinheit GmbH & Co. KG of Gremsdorf, Germany.

Figures 16, 17:
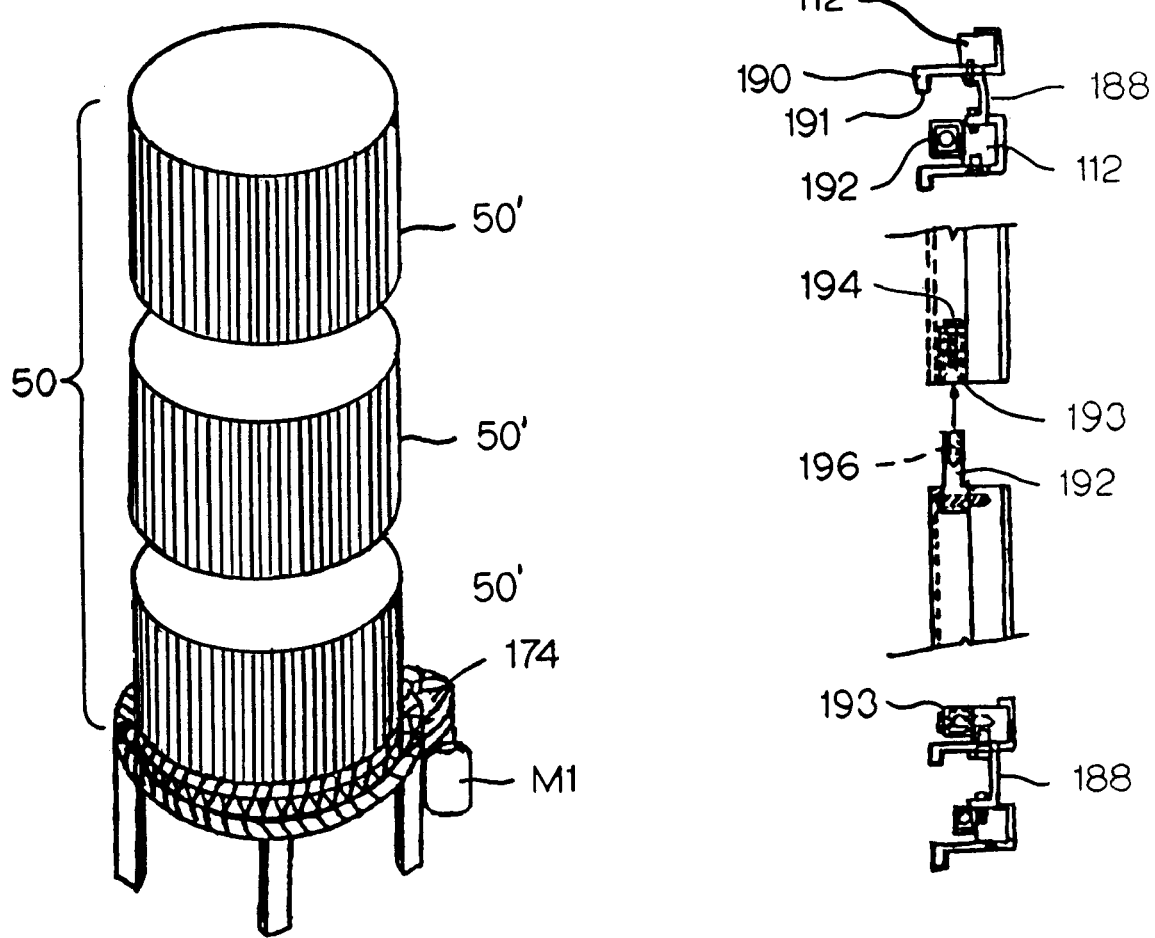
FIG. 16 is an exploded view of a spiral conveyor as in FIG. 1 showing the drum made of three modular sections.
FIG. 17 illustrates top plan and side elevation views of the fastening system for connecting the stacked drum modules of FIG. 16 together.

As shown in FIGS. 16 and 17, the drum drive 50 can be made of stackable drum modules 50' to form drums of different heights. Connection brackets 188 bolted into the facing sides of consecutive vertical rails 112 retain pusher bars 190 having UHMW or other wear-resistant plastic caps 191 that extend into the interior of the drum to engage the belt's outer side edge on the inner helical track and tie the vertical rail sections together. Outer UHMW or other wear-resistant plastic wear strips 124 cap the outer side of the rails for low-friction contact with the inner edges of the belt on the outer helical track. Male and female pin connectors 192, 193 are bolted to the top and bottom of each rail. When one drum module is stacked atop another, the male pin is received in the female socket to align the rails across narrow seams. A bolt 194 extending through the female receptacle is screwed into a threaded hole 196 in the male pin 192 to hold the stacked drum modules together. In this way, any number of drum modules may be stacked and driven by a single slew drive 174 attached to the bottom-most drum module.

Figure 18:
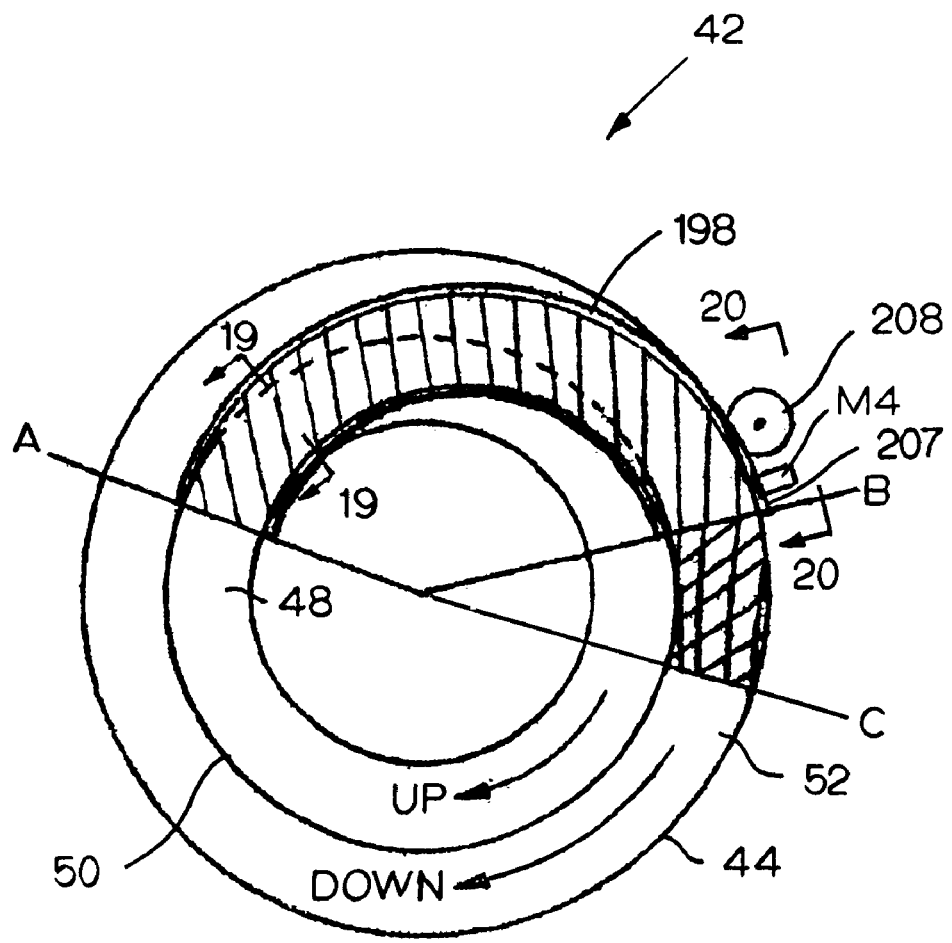
FIG. 18 is a top plan view of the conveyor-belt overlap region at the top of the drive drum in a spiral conveyor as in FIG. 1.

At the top of the spiral conveyor 42, the conveyor belt 44 follows the overlap, or transition, path 54 from point A to point C along a transition track 192 as shown in FIG. 18. At point A, the belt spiraling upward on the inner helical path 48 reaches the top end of the vertical rails and disengages from the drum. The transition track 198 guides the belt along a curved path of increasing radius inclined up to point B, the highest point on the belt's path. Between points B and C, the belt rides on a declining path until its inner edge engages the outer side of the drum 50 at the entrance to the outer helical path 52.

As shown in FIG. 19, the transition track 198 includes supports 200 supporting the conveyor belt 44 across its width. Holddown arms 202 extending over the outer and inner side edges 120, 121 of the belt from outer and inner side guides 204, 205 retain the belt on the transition track. Rollers 206 along the inner side guide 205 present a low-friction rolling surface to the inner side edge 121 of the belt.

Figure 20:
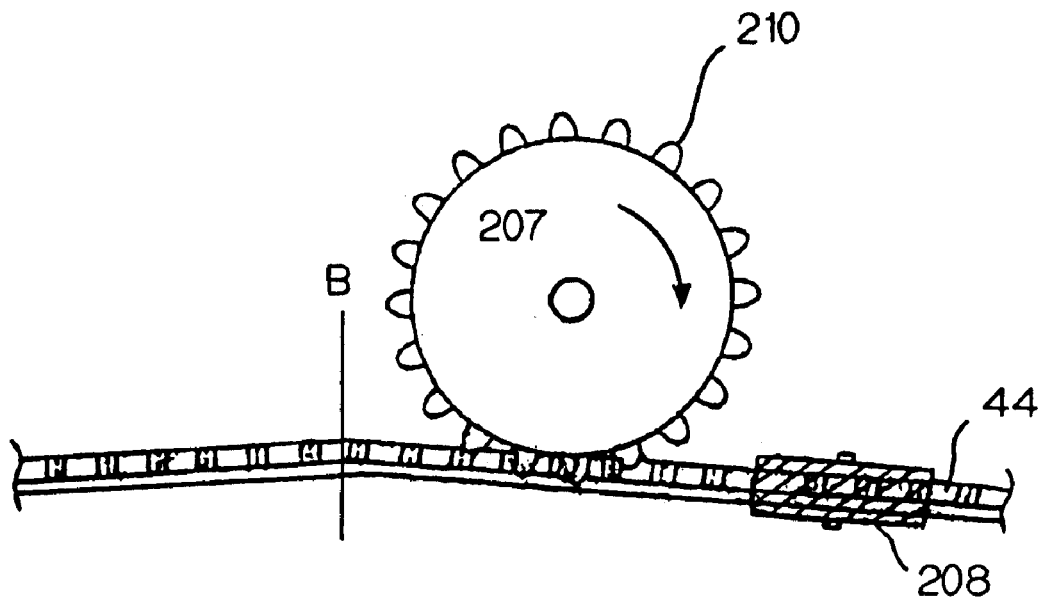
FIG. 20 is a side elevation view of one version of an intermediate drive in the overlap region of FIG. 18.
Figure 21:
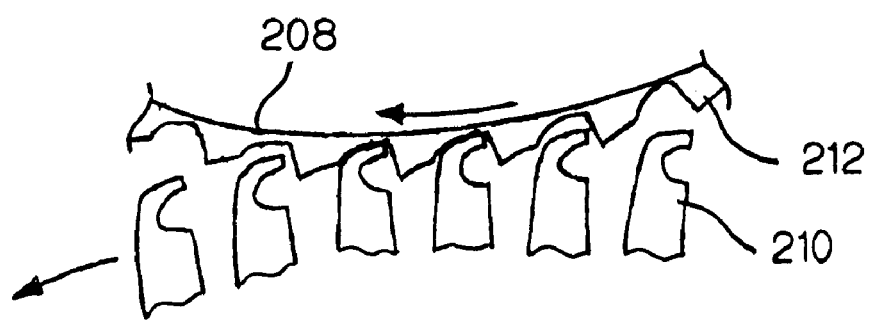
FIG. 21 is a top plan view showing the engagement of a link-separating sprocket with the conveyor belt in the overlap region of FIG. 18.
Figure 22:
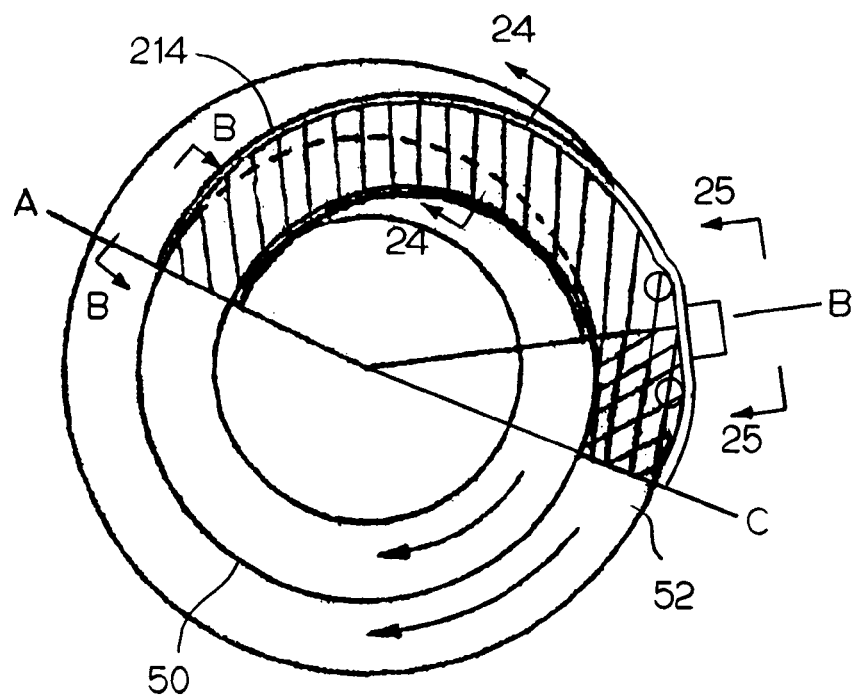
FIG. 22 is a top plan view of another version of overlap region at the top of the drive drum in a spiral conveyor as in FIG. 1.
Figure 23:
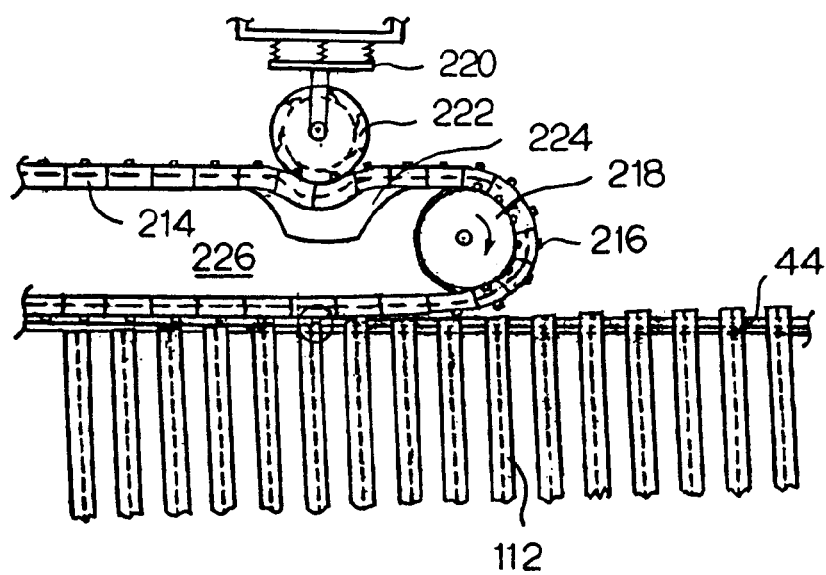
FIG. 23 is a side elevation view of the tensioning portion of another version of an intermediate drive in the overlap region of FIG. 22.
Figure 24:
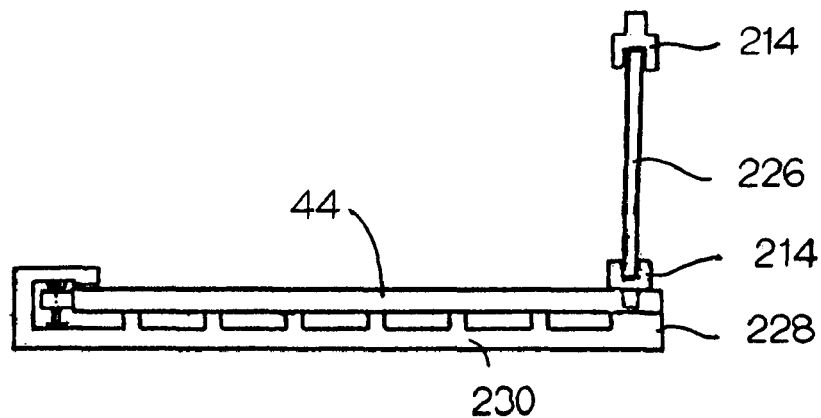
FIG. 24 is a cross section of the conveyor belt and its track in the overlap region of FIG. 22.
Figure 25:
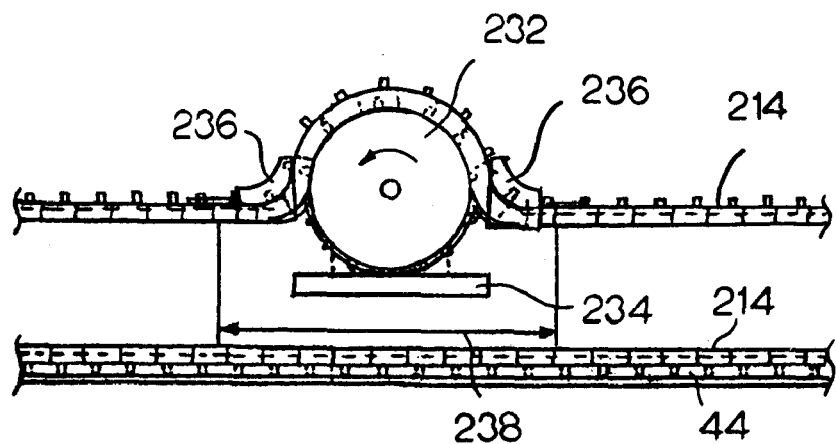
FIG. 25 is a side elevation view of the intermediate drive in the overlap region of FIG. 22.

An intermediate-drive timing sprocket 207, driven by a motor M4, drives the belt just before the apex at point B on the transition track. The purpose of the intermediate drive is to eliminate the build-up of slack in the belt in the transition region between the positively driven inner helical track and the frictionally driven outer helical track. A link-separating wheel 208, as shown in FIGS. 20 and 21, expands the outer edge 120 of the belt so that the belt is properly engaged by cog teeth 210 on the timing sprocket 207, which has the same pitch $P_T$ as the infeed timing sprocket 159. The transition timing sprocket's teeth 210 engage the belt in the same way as the teeth 160 of the infeed timing sprocket 159 in FIG. 13. The overlap timing sprocket 207 helps pull the belt up the incline portion of the transition track. Like the infeed separation sprocket 164 of FIG. 12, the link-separation wheel 208 has teeth 212 that engage the outer belt edge 112 to expand that edge to its maximum pitch.

Another version of the transition, or overlap, portion of the conveyor is shown in FIGS. 22-26. A transfer chain 214 with drive lugs 216 engages receptacles in the outer edge 120 of the belt just before it exits the inner helical track at point A. At point A, the transfer chain 214 reverses around an idler wheel 218 that guides the lugs 216 into engagement with the receptacles in the belt. A spring-loaded tensioning system 220 biases a tensioning wheel 222 against the transfer chain 214 along the chain's run opposite the belt into a tensioning gap 224 formed in a chain guide 226 to take up slack in the chain and insure proper engagement. The entire chain mechanism is supported in the conveyor frame. The chain guide 226 follows the outer side 228 of a transition track 230 from point A to point C at the entry of the conveyor belt 44 into frictional engagement with the outer side of the drum 50 on the outer helical path. Thus, the transfer-chain system operates as an intermediate drive in the overlap section of the conveying path.

Figure 26:
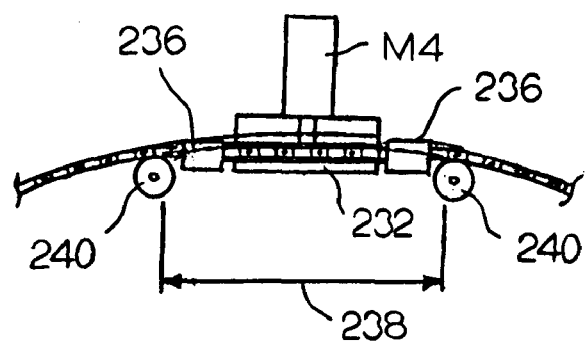
FIG. 26 is a top plan view of the intermediate drive of FIG. 25.

The transfer chain 214 is driven by a drive sprocket 232 rotated by a motor M4 mounted on a motor support 234 in the conveyor framework. Link guides 236 flanking the sprocket guide the chain into engagement with the sprocket. As best shown in FIG. 26, positioning rollers 240 divert the transfer chain 214 from its curved path into a straight path 238 for proper engagement with the drive sprocket 232. Although not shown in the drawings, the transfer chain disengages from the outer edge of the conveyor belt at the end of the transition track at point C.

Figure 27:
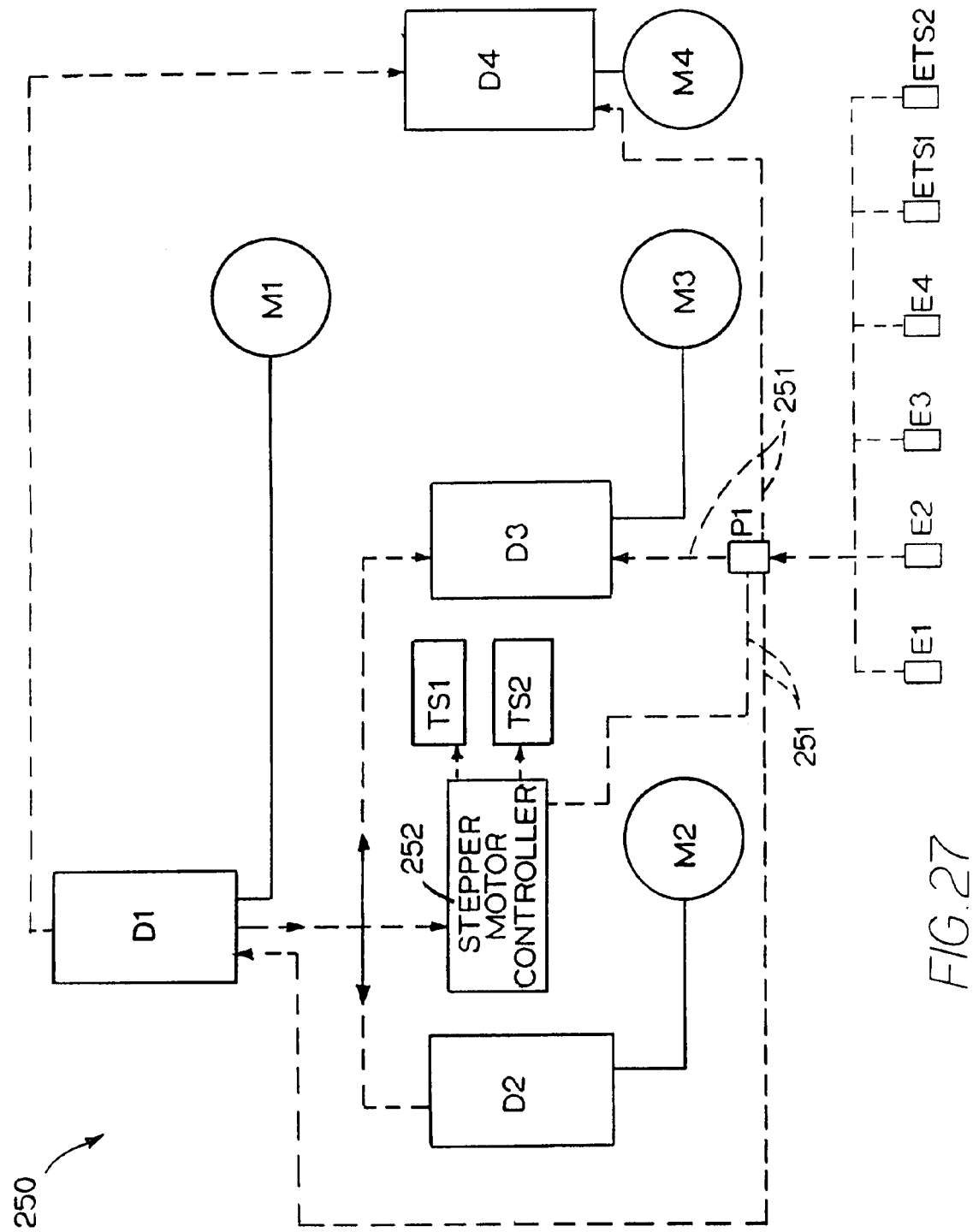
FIG. 27 is a block diagram of a controller with feedback for closed-loop control of a spiral conveyor as in FIG. 1.

The spiral conveyor system may be controlled by a control system as in FIG. 27. The control system includes a controller P1, such as a programmable logic controller, a PC, a motor control center, an embedded microcontroller, or any suitable programmable device. In the example of FIG. 27, the controller P1 sends speed control commands over command lines 251 to servomotor or variable-frequency drives D1, D3, and D4 and to a stepper motor controller 252. The motor drives D1, D3, and D4 control the speeds of the slew-drive motor M1, the spiral conveyor's tail-end motor M3, and the intermediate-drive motor M4 in the overlap region. The head-end motor M2 would typically be driven by motor drive D2 with a signal generated by the drum drive D1 because of the tight relationship required between the head-end sprockets' speed and the speed of the drum in an overdriven drum-drive system. But the controller P1 could alternatively send a speed control command directly to the head-end drive D2. And, like the head-end drive, the tail-end drive D3 and the overlap drive D4 could alternatively receive their speed control commands from the drum drive D1. The stepper motor controller 252 controls the operation of the stepper motors TS1 and TS2 that drive the infeed timing sprockets 159 and 164, if the link-separation sprocket 164 is driven. But servomotors and drives may be used instead of stepper motors and a stepper controller 252. Although not shown, another drive could be used to control the speed of a motor driving the link-separation wheel 208 in the overlap drive of FIG. 18. Shaft encoders or other speed sensors E1, E2, E3, E4, ETS1, and ETS2 provide the controller P1 with information to compute the speeds of the motors M1, M2, M3, M4, TS1, and TS2 and close the control loop.

A cageless spiral drive drum 260, as in FIG. 28, may be made inexpensively according to a method described with reference to FIGS. 28-32. As shown in FIG. 29, the drum is formed from a rectangular sheet 262 of stainless steel, preferably 3/16 in to 3/8 in thick. Bolt holes 264 and rectangular openings 266 are cut in the sheet by laser, water jet, stamp, or drill. The rectangular openings 266 are arranged in rows and columns separated by vertical and horizontal strips 268, 269. After the openings and the bolt holes are cut, the sheet is bent, preferably by rolling on a die, to form the cylindrical drum 260 of FIG. 28. The side edges 270, 271 of the rolled drum are fastened together in abutment by welding, for example. The outer surface 272 of the drum may be provided with a diamond-cut, polished, perforated, or recessed dimpled surface, as examples, to suit the application. The rectangular openings 266 maximize air flow.

A reinforcing band 274 (FIG. 30) with bolt holes 276 in a pattern matching the bolt holes 264 on the drum is welded to the inner side of the drum along a circumferential strip 278 at the bottom 280 of the drum. As shown in FIG. 32, the reinforcing band 274 provides a solid backing at the bottom of the drum to which a slewing-ring bracket may be bolted as in FIGS. 14 and 15.

Elongated engagement members 282 welded to the vertical strips 268, as shown in FIG. 31, form vertical rails on the inner side 284 of the drum. The engagement members engage the outer edge of the belt on its inner helical path. The spacing of the vertical rails defines the drive pitch $P_D$, which is equal to or is an integral multiple of the expanded belt pitch. Also welded to the drum along its inner side 284 are horizontal rings of angle iron 286 for additional reinforcement.

As shown in FIGS. 29 and 33, the top edge 288 of the drum may include a tongue 290 and the bottom edge 289 may include a groove 291. In this way, a taller modular drum may be made by stacking similar modular drums 260 joined at tongue-and-groove joints without the need for the fastening system shown in FIG. 17 for joining stacked caged drums.

Thus, the double-helix spiral conveyor described in various versions provides a single drive drum driving a single continuous length of conveyor belt along inner and outer surfaces of the rotating drive drum. The drum can be rotated by a single slew drive. And upper and lower slider trays can be used to align and provide any belt tensioning or pitch adjustment necessary for smoothly transitioning the conveyor belt onto the inner and outer helical paths.

Although the invention has been described in detail with reference to a few preferred versions, other versions are possible. For example, the conveyor belt may be driven up the outer helical path and down the inner helical path instead. As another example, the drum made according to FIGS. 28-32, but without the need for the engagement members 282, is usable in single spiral conveyors as well as in double-helix spiral conveyors. As yet another example, in some applications, capping the vertical rails with UHMW or other plastic wear stripping is unnecessary or even undesirable. For those applications, a polished stainless steel surface may be a preferable alternative. In addition to being useful in processing applications such as freezing, chilling, cooling, baking, and proofing, the double-helix spiral conveyor may be used in other applications, such as primary and secondary packaging support and accumulation of cartons, cases, bottles, cans, and the like. So, as these few examples suggest, the claims are not meant to be limited to the details of the versions described by way of example.

What is claimed is:

1. A spiral conveyor comprising:
   a rotating drive drum having an inner side, an outer side, a top, and a bottom;
   a conveyor belt collapsible in length to negotiate turns and driven along an inner helical path inside the rotating drive drum with a vertical component of motion in one direction by engagement of an outer belt edge with the inner side of the rotating drive drum and driven along an outer helical path outside the rotating drive drum with a vertical component of motion in the opposite direction by engagement of an inner belt edge with the outer side of the rotating drive drum.

2. A spiral conveyor as in claim 1 wherein the conveyor belt is driven upward from the bottom to the top along the inner helical path and downward along the outer helical path.

3. A spiral conveyor as in claim 1 further comprising a slew drive attached to the drive drum to rotate the drive drum.

4. A spiral conveyor as in claim 1 wherein the conveyor belt further includes drive-receiving elements in the outer belt edge and wherein the drive drum further includes vertical rails equally spaced apart on spacings defining a drive pitch on the inner side of the drive drum in positive driving engagement with the drive-receiving elements in the outer belt edge on the inner helical path.

5. A spiral conveyor as in claim 4 wherein the drive-receiving elements in the outer belt edge include drive-receiving surfaces with a shape complementary to the shape of the vertical rails at the area of engagement.

6. A spiral conveyor as in claim 4 wherein the drive-receiving elements in the outer belt edge include rollers that ride along the vertical rails as the conveyor belt is driven along the inner helical path.

7. A spiral conveyor as in claim 4 wherein the drive-receiving elements in the outer belt edge include retention structure that cooperates with the vertical rails to retain the edge of the conveyor belt in engagement with the vertical rails.

8. A spiral conveyor as in claim 4 wherein the drive-receiving elements in the outer belt edge are rounded or tapered to minimize the area of frictional contact with the vertical rails.

9. A spiral conveyor as in claim 4 wherein the conveyor belt has a fully expanded belt pitch defined by the distance between consecutive drive-receiving elements when the conveyor belt is fully expanded and wherein the drive pitch on the inner side of the drive drum is less than an integral multiple of the fully expanded pitch so that the conveyor belt is operated in a partly collapsed state along the outer belt edge with a belt pitch less than the fully expanded belt pitch.

10. A spiral conveyor as in claim 4 further comprising a timing sprocket rotating in synchrony with the drive drum and having teeth with a pitch integrally related to the drive pitch, wherein the timing sprocket is positioned along the inner helical path at the bottom of the rotating drive drum to engage the outer belt edge to feed the drive-receiving elements into positive engagement with the vertical rails.

11. A spiral conveyor as in claim 10 further comprising belt tensioning means positioned to apply tension to uncollapse the outer belt edge for engagement with the timing sprocket.

12. A spiral conveyor as in claim 11 wherein the belt tensioning means includes a second sprocket having a pitch equal to the pitch of the timing sprocket, wherein the second sprocket has teeth that fit into the outer belt edge between consecutive drive-receiving elements to uncollapse the outer belt edge.

13. A spiral conveyor as in claim 1 wherein the conveyor belt further includes drive-receiving elements in the inner belt edge and wherein the drive drum further includes vertical rails equally spaced apart on spacings defining a drive pitch on the outer side of the drive drum in positive driving engagement with at least some of the drive-receiving elements in the inner belt edge on the outer helical path.

14. A spiral conveyor as in claim 1 further comprising an infeed path for the conveyor belt leading tangentially to the inner helical path at the bottom of the rotating drive drum.

15. A spiral conveyor as in claim 14 wherein the infeed path includes an adjustable slider tray for adjusting the entry of the conveyor belt onto the inner helical path.

16. A spiral conveyor as in claim 1 further comprising a discharge path for the conveyor belt extending tangentially from the outer helical path at a discharge level between the top and the bottom of the rotating drive drum.

17. A spiral conveyor as in claim 1 comprising a transition path linking the inner helical path and the outer helical path at the top of the rotating drive drum and further comprising a discharge conveyor including a deflection roller selectively positionable against the conveyor along the transition path to deflect the conveyor belt downward below the discharge conveyor positioned to intercept and discharge articles received from the conveyor belt.

18. A spiral conveyor as in claim 1 comprising a transition path linking the inner helical path and the outer helical path at the top of the rotating drive drum and further comprising a rotating intermediate drive sprocket engaging the conveyor belt at the top of the rotating drive drum.

19. A spiral conveyor as in claim 1 comprising a transition path linking the inner helical path and the outer helical path at the top of the rotating drive drum and further comprising a transfer chain having lugs engaging the conveyor belt at the top of the rotating drive drum.

20. A spiral conveyor as in claim 1 comprising a slider tray linking the inner helical path and the outer helical path at the top of the rotating drive drum and further comprising a tensioning system attached to the slider tray to distort the slider tray to adjust tension in the conveyor belt.

21. A spiral conveyor as in claim 1 wherein the drive drum comprises a stack of cylindrical drum modules.

22. A spiral conveyor as in claim 1 wherein the engagement of the inner belt edge with the outer side of the rotating drive drum is frictional.

23. A method for conveying up and down a spiral conveyor with a single rotating drum, comprising:
    driving a conveyor belt with a vertical component of motion in a first direction up or down a rotating drum along an inner helical path inside the inner side of the rotating drum by contacting the outer edge of the conveyor belt with the inner side of the rotating drum;
    driving the conveyor belt with a vertical component of motion in an opposite second direction down or up the rotating drum along an outer helical path outside the outer side of the rotating drum by contacting the inner edge of the conveyor belt with the outer side of the rotating drum.

24. The method of claim 23 wherein the conveyor belt is driven in the second direction by frictionally contacting the inner edge of the conveyor belt with the outer side of the rotating drum.

25. The method of claim 23 wherein the conveyor belt is driven in the second direction by positively driving spaced apart drive-receiving elements in the inner edge of the conveyor belt with circumferentially spaced drive elements on the outer side of the rotating drum.

26. The method of claim 23 wherein the conveyor belt is driven in the first direction by positively driving spaced apart drive-receiving elements in the outer edge of the conveyor belt with circumferentially spaced drive elements on the inner side of the rotating drum.

27. The method of claim 26 further comprising:
    retaining the outer edge of the conveyor belt in engagement with the circumferentially spaced drive elements on the inner side of the rotating drum by means of cooperating retention structure on the drive-receiving elements in the outer edge of the conveyor belt; and
    retaining the inner edge of the conveyor belt in contact with the outer side of the rotating drum drive by means of tension in the conveyor belt.

28. The method of claim 23 further comprising:
    uncollapsing the outer edge of the conveyor belt to space the drive-receiving elements apart to match the spacing of the circumferentially spaced drive elements on the inner side of the rotating drive drum; and
    timing the entry of the conveyor belt into the inner helical path to ensure proper engagement of the drive-receiving elements with the drive elements.

29. The method of claim 23 further comprising:
    driving the conveyor belt up the inner helical path and down the outer helical path.

30. The method of claim 23 further comprising:
    discharging articles from the conveyor belt on the outer helical path at a discharge level between the top and the bottom of the rotating drive drum.

31. The method of claim 23 further comprising:
    rotating the drum with a slew drive.

32. The method of claim 23 further comprising:
    partially collapsing the conveyor belt at its outer edge along the inner helical path.

\* \* \* \* \*